United States Patent
Clauer Salyers

(10) Patent No.: US 10,380,993 B1
(45) Date of Patent: Aug. 13, 2019

(54) VOICE COMMANDS FOR THE VISUALLY IMPAIRED TO MOVE A CAMERA RELATIVE TO A DOCUMENT

(71) Applicant: United Services Automobile Association (USAA), San Antonio, TX (US)

(72) Inventor: Harmony Jane Clauer Salyers, San Antonio, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

(21) Appl. No.: 15/411,388

(22) Filed: Jan. 20, 2017

Related U.S. Application Data

(60) Provisional application No. 62/281,840, filed on Jan. 22, 2016.

(51) Int. Cl.
| | |
|---|---|
| *G10L 25/57* | (2013.01) |
| *G06K 9/32* | (2006.01) |
| *G10L 13/04* | (2013.01) |
| *G06F 3/16* | (2006.01) |
| *G09B 21/00* | (2006.01) |
| *H04N 5/222* | (2006.01) |
| *H04N 5/232* | (2006.01) |

(52) U.S. Cl.
CPC .......... *G10L 13/043* (2013.01); *G06F 3/167* (2013.01); *G09B 21/006* (2013.01); *H04N 5/2222* (2013.01); *H04N 5/23216* (2013.01)

(58) Field of Classification Search
CPC ......... G10L 25/48; G10L 25/51; G10L 25/25; G10L 25/57; G06K 9/00442; G06K 9/32; G06K 9/4604; G06Q 40/02; G09B 21/006
USPC .............. 704/270, 271; 382/137, 140, 151; 705/45
See application file for complete search history.

(56) References Cited

U.S. PATENT DOCUMENTS

| | | | |
|---|---|---|---|
| 7,962,411 B1 | 6/2011 | Prasad et al. | |
| 8,351,678 B1 | 1/2013 | Medina, III | |
| 8,542,921 B1 | 9/2013 | Medina | |
| 8,837,806 B1* | 9/2014 | Ethington | G06Q 40/02 382/140 |
| 8,977,571 B1* | 3/2015 | Bueche, Jr. | G06Q 40/02 705/44 |
| 9,177,198 B1 | 11/2015 | Prasad et al. | |
| 9,569,756 B1* | 2/2017 | Bueche, Jr. | G06Q 40/02 |
| 2011/0149117 A1* | 6/2011 | Vendrig | H04N 5/2226 348/239 |
| 2011/0181735 A1* | 7/2011 | Goktekin | G06K 9/228 348/188 |

(Continued)

OTHER PUBLICATIONS

U.S. Appl. No. 12/195,723, filed Aug. 21, 2008, 38 pages.

*Primary Examiner* — Martin Lerner
(74) *Attorney, Agent, or Firm* — Brink Gilson & Lione

(57) ABSTRACT

A system and method for providing aural guidance in imaging a document is disclosed. Visually impaired people may have difficulty when imaging a document with a mobile computing device. The system and method may analyze the image of the document in the imaging device, and output one or more aural directions in order for the user to move the document and/or camera for proper imaging of the document. In that regard, those with visual impairments may be assisted in imaging documents using a mobile computing device.

13 Claims, 45 Drawing Sheets

(56) References Cited

U.S. PATENT DOCUMENTS

| | | | |
|---|---|---|---|
| 2011/0188783 A1* | 8/2011 | Minoni | G09B 21/006 382/314 |
| 2012/0080523 A1* | 4/2012 | D'urso | G09B 21/006 235/404 |
| 2013/0124414 A1* | 5/2013 | Roach | G06Q 20/10 705/44 |
| 2013/0271584 A1* | 10/2013 | Wexler | G09B 21/006 348/62 |
| 2015/0262366 A1* | 9/2015 | Huang | G03B 35/02 348/50 |
| 2016/0125613 A1* | 5/2016 | Shustorovich | G06K 9/00463 382/140 |
| 2016/0267319 A1* | 9/2016 | Murillo | G06K 9/00255 |
| 2017/0170899 A1* | 6/2017 | Breuer | G01C 3/08 |
| 2018/0124309 A1* | 5/2018 | Tierney | G09B 21/006 |

* cited by examiner

FIG. 7R
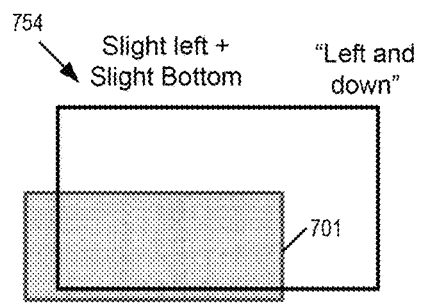
FIG. 7S
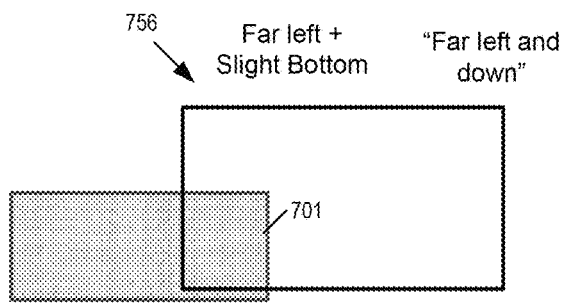
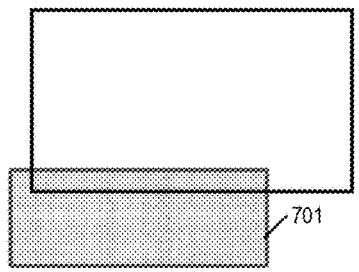
FIG. 7T
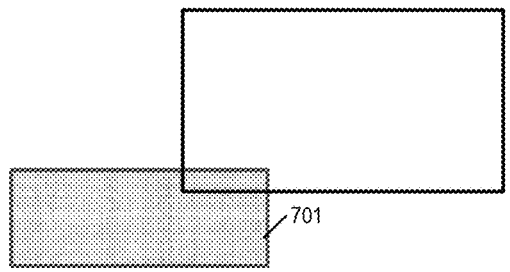
FIG. 7U

FIG. 7V  
Slight Right+ Slight Bottom
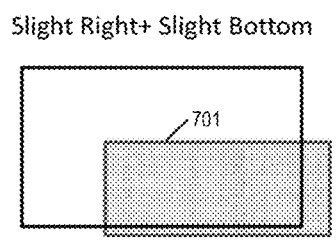
FIG. 7W  
Far Right+ Slight Bottom
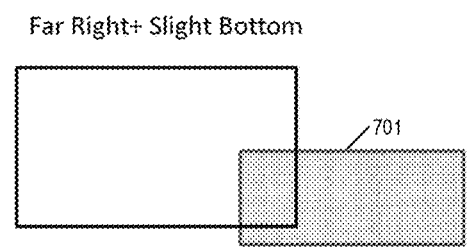
Slight Right+ Far Bottom
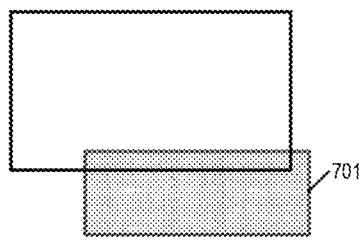
Far Right + Far Bottom
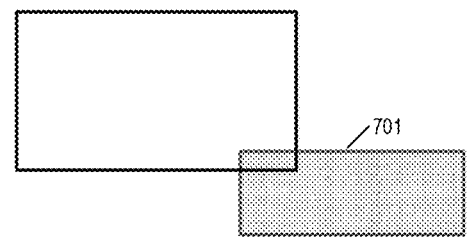
FIG. 7X
FIG. 7Y

| FIG. | Left | Right | Top | Bottom | Left Invert | Right Invert | Bottom Invert | Top Invert | Result |
|---|---|---|---|---|---|---|---|---|---|
| 7A | Y | Y | Y | Y | N | N | N | N | "Hold Steady" |
| 7B | N | Y | Y | Y | N | N | N | N | "Left" |
| 7C | N | N | Y | Y | Y | N | N | N | "Left" |
| 7D | Y | N | Y | Y | N | N | N | N | "Right" |
| 7E | N | N | Y | Y | N | Y | N | N | "Right" |
| 7F | Y | Y | N | Y | N | N | N | N | "Up" |
| 7G | Y | Y | N | N | N | N | N | Y | "Up" |
| 7H | Y | Y | Y | N | N | N | N | N | "Down" |
| 7I | Y | Y | N | N | N | N | Y | N | "Down" |
| 7J | N | Y | N | Y | N | N | N | N | "Zoom Out" |
| 7L | N | N | N | Y | Y | N | N | N | "Left" |
| 7K | N | Y | N | N | N | N | N | Y | "Up" |
| 7M | N | N | N | N | Y | N | N | Y | "Zoom Out" |
| 7N | Y | N | N | Y | N | N | N | N | "Zoom Out" |
| 7P | Y | N | N | N | N | N | N | Y | "Up" |
| 7O | N | N | N | Y | N | Y | N | N | "Right" |
| 7Q | N | N | N | N | N | Y | N | Y | "Zoom Out" |
| 7R | N | Y | Y | N | N | N | N | N | "Zoom Out" |
| 7T | N | Y | N | N | N | N | Y | N | "Down" |
| 7S | N | N | Y | N | Y | N | N | N | "Left" |
| 7U | N | N | N | N | Y | N | Y | N | "Zoom Out" |
| 7V | Y | N | Y | N | N | N | N | N | "Zoom Out" |
| 7X | Y | N | N | N | N | N | Y | N | "Down" |
| 7W | N | N | Y | N | N | Y | N | N | "Right" |
| 7Y | N | N | N | N | N | Y | Y | N | "Zoom Out" |

FIG. 7Z

FIG. 8B
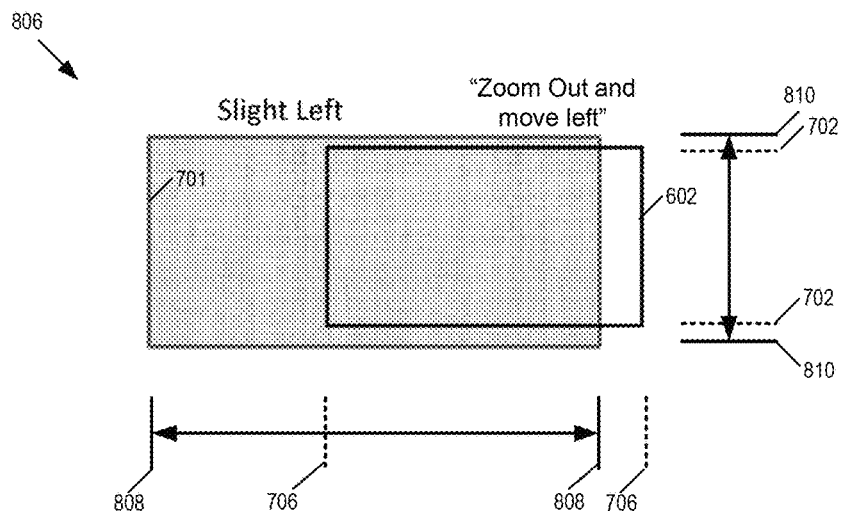
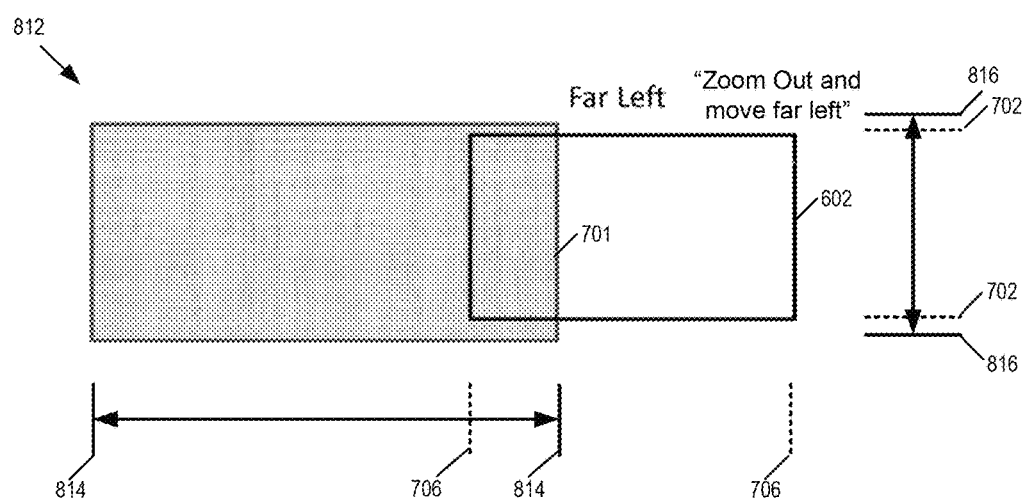
FIG. 8C

FIG. 8F
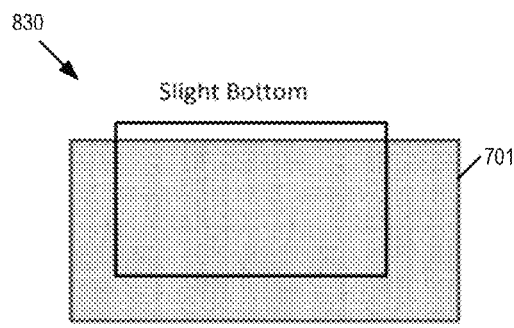
FIG. 8G
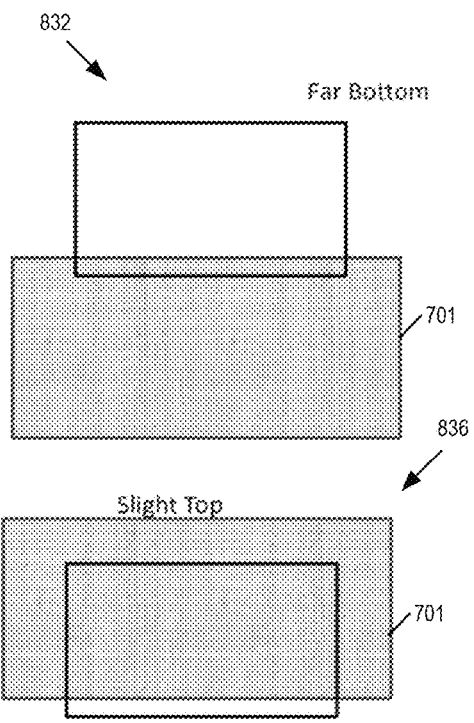
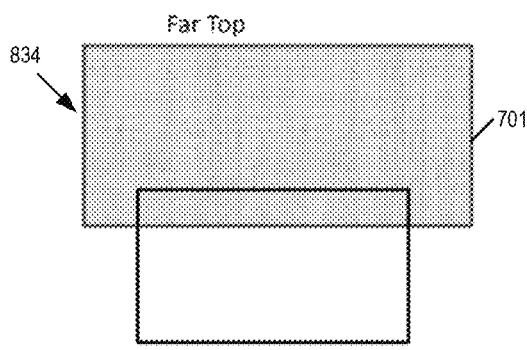
FIG. 8H
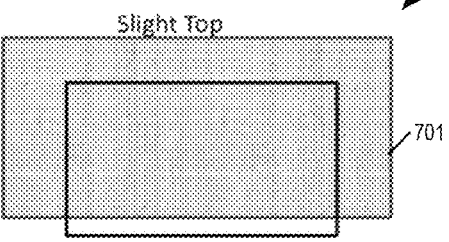
FIG. 8I

862    FIG. 8V
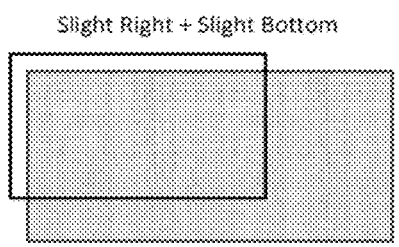
Slight Right + Slight Bottom
864    FIG. 8W
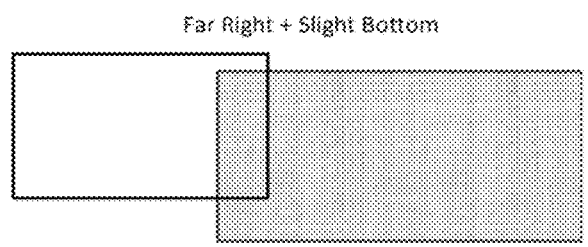
Far Right + Slight Bottom
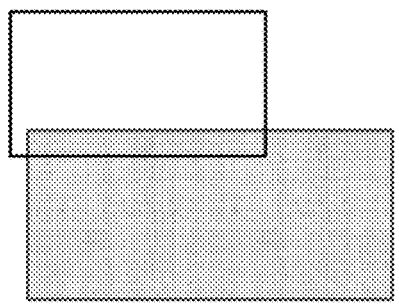
Slight Right + Far Bottom
866    FIG. 8X
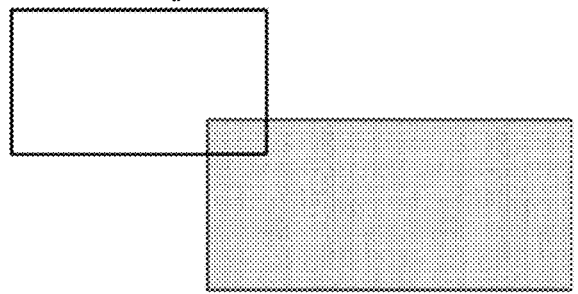
Far Right + Far Bottom
868    FIG. 8Y FIG. 9F
930
Left Middle
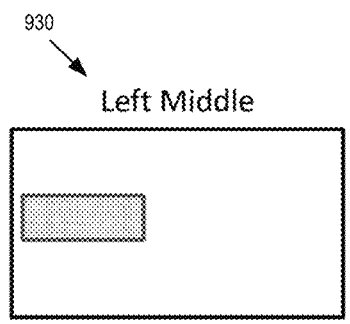
Right Middle
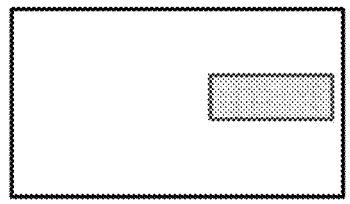
934
FIG. 9H
FIG. 9G
932
Top Middle
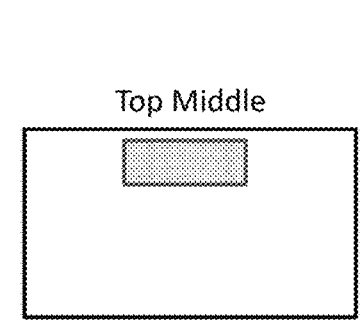
Bottom Middle
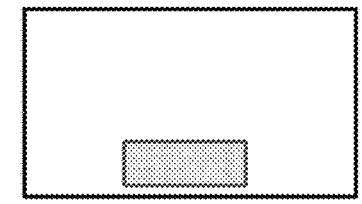
936
FIG. 9I Bottom

VOICE COMMANDS FOR THE VISUALLY IMPAIRED TO MOVE A CAMERA RELATIVE TO A DOCUMENT

REFERENCE TO RELATED APPLICATION

This application claims the benefit of U.S. Provisional Application No. 62/281,840 (filed on Jan. 22, 2016), which is incorporated by reference herein in its entirety.

BACKGROUND

Currently, a user may electronically deposit a negotiable instrument, such as a check, in a financial services institution using scanning and imaging techniques. Conventionally, the user uploads an image of the negotiable instrument to the financial services institution where it is stored in a storage device. An advisory is sent to the user from the financial services institution confirming that the image was uploaded successfully. The user responds to the advisory, which in turn activates an image processing servlet at the financial services institution which processes the image to deposit the negotiable instrument into an account specified by the user.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings:

FIGS. 7R-U show an alignment guide and a negotiable instrument within the alignment guide indicating no zoom is recommended, illustrating downward and leftward movement is recommended;

FIGS. 7V-Y show an alignment guide and a negotiable instrument within the alignment guide indicating no zoom is recommended, illustrating downward and rightward movement is recommended;

FIG. 7Z illustrate a table of inputs to the decision engine and outputs of the decision engine.

FIGS. 8B-C show an alignment guide and a negotiable instrument within the alignment guide indicating zoom out is recommended and illustrating left movement is recommended;

FIGS. 8F-I show an alignment guide and a negotiable instrument within the alignment guide indicating zoom out is recommended, with FIGS. 8F-G illustrating upward movement is recommended and FIGS. 8H-I illustrating downward movement is recommended;

FIGS. 8V-Y show an alignment guide and a negotiable instrument within the alignment guide indicating zoom out is recommended, and illustrating downward and rightward movement is recommended;

FIGS. 9D-E show an alignment guide and a negotiable instrument within the alignment guide indicating zoom in is recommended and illustrating the negotiable instrument in the lower left quadrant in FIG. 9D and in the lower right quadrant in FIG. 9E;

FIGS. 9F-I show an alignment guide and a negotiable instrument within the alignment guide indicating zoom in is recommended, with the figures illustrating left middle, top middle, right middle and bottom middle, respectively;

DETAILED DESCRIPTION

A user may electronically deposit a negotiable instrument (or other types of document, such as a contract) using a camera on a mobile device or apparatus. For example, the mobile device may include a screen that displays an alignment guide and the image of the negotiable instrument generated by the camera. In this regard, the screen provides the feedback for the user to determine whether the negotiable instrument is within the alignment guide. Visually impaired users may be unable to use the screen to determine whether the negotiable instrument is properly captured by the image. The discussion below focuses on capturing an image of a negotiable instrument. However, other types of documents, such as a contract or other legally binding document, are contemplated. In this regard, the below discussion relating to capturing the image of a negotiable instrument may be applied to the other types of documents. Further, one type of document comprises a financial document, which includes a negotiable instrument, a contract, or other documents of a financial nature.

Figure 6A:
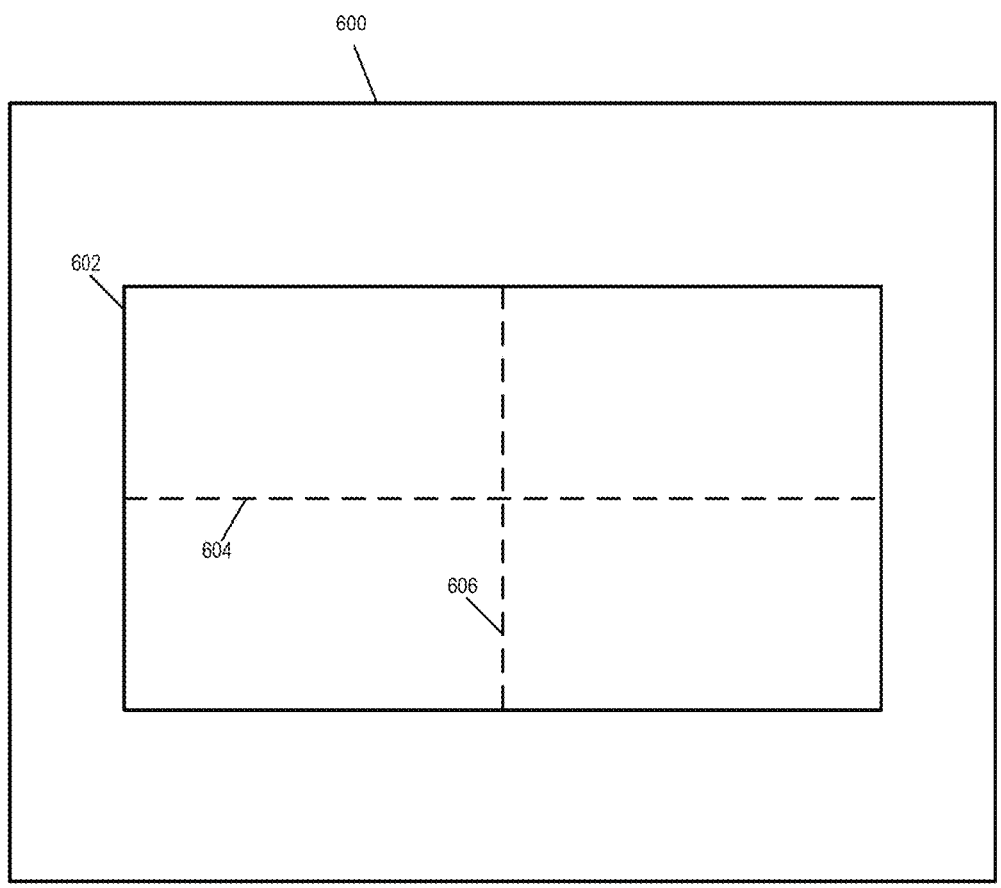
FIG. 6A shows a field of view of a camera and an alignment guide within the field of view.

In one aspect, a method and apparatus for analyzing an image to detect one or more edges of a negotiable instrument is disclosed. An alignment guide may be integrated with, superimposed on, or used in combination with the image. For example, when displaying the image on a screen of the mobile device, the alignment guide may be superimposed thereon. The alignment guide may cover the entire field-of-view of the camera, or may cover less than the entire field-of-view of the camera, such as illustrated in FIG. 6A. The alignment guide may be used when detecting one or more edges of the negotiable instrument in the image. In one embodiment, different sections of the image, corresponding to different sections of the alignment guide, may be analyzed to determine whether there are edges of the negotiable instrument within the different sections of the image and/or a number of pixels that correspond to the edge. The different sections or portions of the image may be mutually exclusive of one another (e.g., no pixels from one section are included in another section) or may have some (but not entire) overlap (e.g., some pixels from one section may be shared with another section whereas other pixels from the one section are not included in any other section). For example, the alignment guide may comprise a rectangle. One division of the rectangular alignment guide comprises a top half and a bottom half. In one example, the area for the top half is equal to the area of the bottom half. In another example, the areas for the top half and the bottom half are not equal. In this division, the top half of the image (as defined by the top half of the rectangular alignment guide) is analyzed to determine whether edges are detected therein. Further, the bottom half of the image (as defined by the top half of the rectangular alignment guide) is analyzed to determine whether edges are detected therein.

Another division of the rectangular alignment guide comprises a left half and a right half. In this division, the left half of the image (as defined by the left half of the rectangular alignment guide) is analyzed to determine whether edges are detected therein. Further, the right half of the image (as defined by the right half of the rectangular alignment guide) is analyzed to determine whether edges are detected therein.

The image may be input to the camera in one of several ways. In one way, the user may input a request to take a picture of a negotiable instrument (or other document). The request may comprise the opening or activating of an app to analyze the image for edges and then take the picture. Or, the request may comprise, after opening the app, a user input to take a picture. In response to the request, images may be captured as individual frames of a video (taken by the camera) for the purpose of determining location. In response to determining that the negotiable instrument is properly positioned relative to the camera, the camera may then take a still photo. Alternatively, the images may be captured as a still photo for the purpose of determining location.

Multiple types of analysis may be performed on the sections of the image. In the example of a top half of the rectangular alignment guide, the top portion of the image (corresponding to the top half of the rectangular alignment guide) may be analyzed from the top down, and from the bottom up. In particular, the top portion of the image may comprise columns of pixels, such as columns 1 to N. In this example, the pixels from column 1 are analyzed from top to bottom, and then from bottom to top to determine whether an edge is detected in the column. In this regard, the analysis is bi-directional (e.g., from top to bottom, and from bottom to top). As discussed in more detail below, the analysis of the values of the pixels in the column may determine whether the value for a specific pixel corresponds to an edge of the negotiable instrument. Further, the analysis may count the number of pixels for one, some, or all of the edges detected, as discussed in more detail below. Alternatively, the pixels from column 1 are analyzed from bottom to top, and then from top to bottom to determine whether an edge is detected in the column. In this regard, the pixels are analyzed in two different directions (top to bottom, and bottom to top). Similarly, the pixels from column 2 are analyzed from top to bottom, and then from bottom to top to determine whether an edge is detected in the column, and so on until column N. A similar analysis may be performed for the bottom portion of the image, corresponding to the bottom half of the rectangular alignment guide.

In the example of a left half of the rectangular alignment guide, the left portion of the image (corresponding to the left half of the rectangular alignment guide) may be analyzed from left to right, and from right to left. In particular, the left portion of the image may comprise rows of pixels, such as rows 1 to M. In this example, the pixels from row 1 are analyzed from left to right, and then from right to left to determine whether an edge is detected in the row. Similarly, the pixels from row 2 are analyzed from left to right, and then from right to left to determine whether an edge is detected in the row, and so on until row M. A similar analysis may be performed for the right portion of the image, corresponding to the right half of the rectangular alignment guide.

Other types of analysis on the portions of the image are contemplated. For example, the analysis may be in a single direction for a portion of the image (only top to bottom, only bottom to top, only left to right, or only right to left). As another example, the analysis may be in a single direction for a row (e.g., only left to right, or only right to left) or column (e.g., only top to bottom, only bottom to top), and may vary depending on the row or column (e.g., even rows are left to right and odd rows are right to left; even columns are bottom to top and odd columns are top to bottom).

In addition, the edge analysis on the portions of the image may be performed at the mobile device. In particular, the mobile device need not communicate with the server while the mobile phone is determining the proper placement of the negotiable instrument. Alternatively, the image may be transferred from the mobile device to a server, with the server performing the edge analysis.

The edge analysis may be used to determine a plurality of data points to input to a decision matrix. For example, cropping logic (discussed below) may be used to determine if variance is detected. If so, it is determined whether the variance is "normal" or "inverted". The various determinations are fed to the decision matrix in order to determine whether (or how) to move the negotiable instrument or camera.

In another aspect, a method and apparatus for outputting aural directions or aural guidance to a user when capturing an image is disclosed. As discussed above, the user may use a mobile device that includes a camera (or other type of image capture device) to capture an image (or a series of images) of a negotiable instrument (or other document). The camera may be integral to the mobile device or may be used in combination with the mobile device. In response to the user indicating a request to image the negotiable instrument (such as by opening an app on a mobile phone for imaging documents), the images generated from the camera may be analyzed. In the event that the user is visually impaired, the user may have difficulty positioning the camera relative to the negotiable instrument. For example, the user's placement of the camera relative to the negotiable instrument may be in error in one, some or all of the x-direction, the y-direction, and the z-direction. In order to correct the user's placement, an offset of the negotiable instrument relative to the camera may be determined, with the offset comprising a direction to move one or both of the negotiable instrument or the camera so that the negotiable instrument is entirely within the alignment guide (e.g., entirely within the field of view of the camera) or so that the negotiable instrument is at least a certain percentage of the alignment guide (e.g., 90% of the negotiable instrument is within the field of view of the camera).

In one example, the negotiable instrument is placed on a table (or other surface), with the table defining the x-y plane and the z-direction being defined as perpendicular to the table. To correct the placement of the camera relative to the negotiable instrument, the camera may be moved in the z-direction (e.g., closer to the table or further away from the table), in the x-direction (e.g., to the right or to the left), and/or in the y-direction (upward or downward). Alternatively, the negotiable instrument may be moved relative to the camera, such as in the x-direction (e.g., to the right or to the left), and/or in the y-direction (upward or downward). In this regard, the mobile device may output aural directions (e.g., "zoom in", "zoom out", "to the left", "to the right", "upward", "downward"), either to move the camera, to move the negotiable instrument, or both, in order to assist the user to correct the placement of the camera.

Further, the mobile device may output directions to correct for placement of the camera in a single direction. For example, the mobile device may output a command to "zoom in" or "zoom out" to correct for errors in placement in the z-direction. As another example, the mobile device may output a command to "move left" or "move right" to correct for errors in placement in the x-direction. Alternatively, the mobile device may output directions to correct for placement of the camera in multiple directions. For example, the mobile device may output a command for the user to move the camera relative to the negotiable instrument, such as to "move left and upward" or "move right and downward" to correct for errors in placement in the x-direction and the y-direction. Finally, the mobile device may proceed through a sequence of analyzing and correcting errors in the different directions. For example, the mobile device may first analyze whether there is a need to output a command to correct in the z-direction (e.g., "zoom in" or "zoom out"). After which, the mobile device may analyze whether there is a need to output a command to correct in the x-direction and/or y-direction. As another example, the mobile device may first output aural commands to move left/right and/or upward/downward prior to outputting commands to zoom in/out.

In one example, the audio or aural commands may be generated by an existing audio function resident in the mobile device. In particular, the mobile device may determine the words to input to the audio function in one of several ways. In one way, the mobile device may send the words displayed on the screen to the audio function. In another way, the mobile device may determine, based on the analysis, text to send to the audio function. The audio function may access a library of .wav or MP3 files to generate the aural output.

The mobile device may determine the position of the camera relative to the negotiable instrument based on edge detection. As discussed above, the mobile device may detect the number of edges of the negotiable instrument in the image, and/or the number of pixels counted for one, some, or all of the edges detected. Based on the number of edges detected and the number of counted pixels for the detected edges, the mobile device may determine whether there are errors in the placement of the check in the x-direction, y-direction, and/or z-direction, as discussed in more detail below. In this regard, one or more sides of the negotiable instrument in the view of the camera may be identified and whether the negotiable instrument needs to be moved to the left, right, up, down or zoomed in or out.

In addition, the mobile device may determine the position of the camera at a discrete point in time, or may determine the position of the camera relative to a previous point in time. For example, the mobile device may determine, based on the current or real-time input of the image of the negotiable instrument, whether to output a command to the user (e.g., "zoom-in", "move left", "move upward", "perfect position—hold"). As another example, the mobile device may generate a command based on the current image of the negotiable instrument and based on one or more previous images of the negotiable instrument to output a relative command (e.g., "keep zooming out", "move in the opposite direction", "stop moving"). In this regard, the mobile device may output aural commands that can better assist the user in positioning the camera relative to the negotiable instrument. For example, the mobile device may analyze a first image generated by the camera to determine a first offset of the negotiable instrument relative to the camera. The mobile device may analyze a second image generated by the camera to determine a second offset of the negotiable instrument relative to the camera, with the second image being generated by the camera later in time than the first image. The mobile device may then determine a change between the first offset and the second offset. Finally, the mobile device may generate an aural relative command, which is a command to the user based on previous movement of the user (e.g., "keep zooming out", "move in the opposite direction", "stop moving"). In this way, the mobile device may provide feedback to the user based on previous movement by the user.

Figure 1:
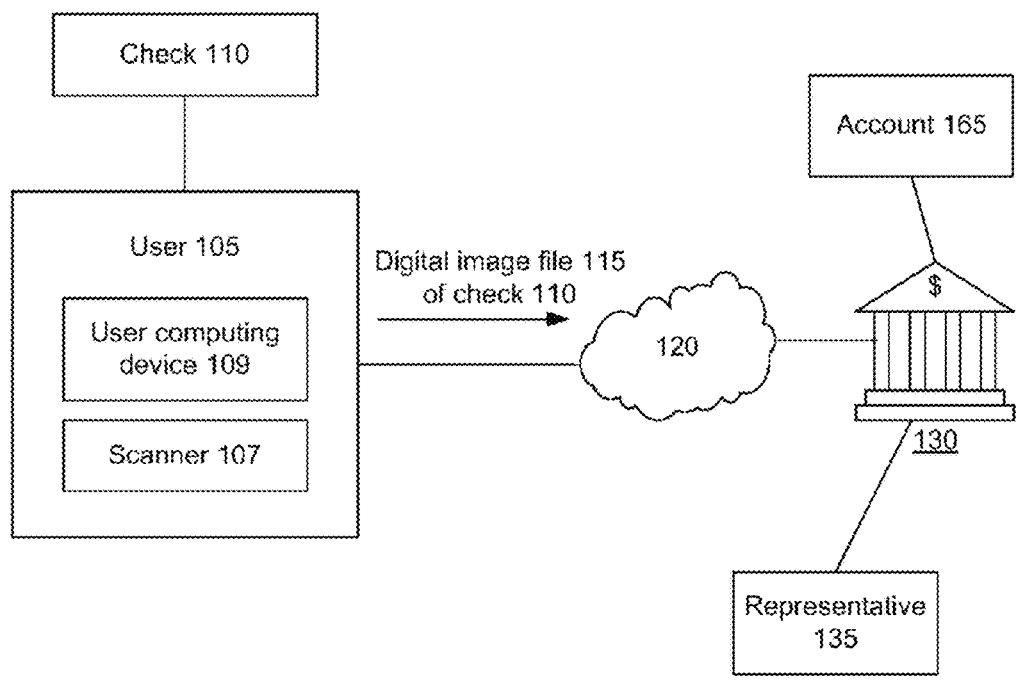
FIG. 1 is a block diagram of an implementation of a system in which example embodiments and aspects may be implemented.

Referring to the figures, FIG. 1 is a block diagram of an implementation of a system 100 in which example embodiments and aspects may be implemented. The system 100 may include a user 105 and an institution 130, which may be any type of entity capable of processing checks (or other types of negotiable instruments) and/or providing funds associated with checks. For example, the institution 130 may be a financial services institution such as a retail bank, an investment bank, an investment company, a regional branch of the Federal Reserve, a clearinghouse bank and/or a correspondent bank. A representative 135 of the institution 130 may provide assistance as described further herein.

The user 105 may be an individual or entity who owns an account 165 that may be held at the institution 130. The account 165 may be any type of account for depositing funds, such as a savings account, a checking account, a brokerage account, and the like. Although only one account 165 is shown, it is contemplated that the user 105 may have any number of accounts held at the institution 130. The user 105 may deposit a check 110 in the account 165 at the institution 130 either electronically or physically. The institution 130 may process and/or clear the check 110.

The user 105 may communicate with the institution 130 by way of a communications network 120, such as an intranet, the Internet, a local area network (LAN), a wide area network (WAN), a public switched telephone network (PSTN), a cellular network, a voice over Internet protocol (VoIP) network, and the like. The user 105 may also communicate with the institution 130 by phone, email, instant messaging, text messaging, facsimile, postal mail, and the like. As described further herein, the user 105 may electronically deposit the check 110 at the institution 130. It is noted that although examples and implementations described herein may refer to a check, the techniques and systems described herein are contemplated for, and may be used for, deposit of any negotiable instrument.

A negotiable instrument typically includes a type of contract that obligates one party to pay a specified sum of money to another party. Negotiable instrument as used herein is an unconditioned writing that promises or orders payment of a fixed amount of money. One example of a negotiable instrument is a check, such as a money order, a cashier's check, a check guaranteed by a bank, or the like. The check may be presented from a first person to a second person to affect the transfer of money from the first person to the second person. It may also include a check that is presented from a company or business to a person. In either case, the check may be taken by the receiving party and deposited into an account at a financial institution of the receiving party. This has required that the receiving party endorse the check and then present it for deposit at a bank branch. However, recent innovations have taken place that have enabled the receiving party to deposit the funds without visiting the bank branch, such as via automated teller machines (ATM). In addition to a check, negotiable instruments may include a draft, a bill of exchange, a promissory note, and the like.

The user 105 may access the institution 130 by opening a communication pathway via the communications network 120 using a user computing device 109. There may be several ways in which the communication pathway may be established, including, but not limited to, an Internet connection via a website of the institution 130. The user 105 may access the website and log into the website using credentials, such as, but not limited to, a username and a password.

The user 105 may use a scanner 107 to generate a digital image (also referred to herein as an "image") of the check 110. The digital image may be used to create a digital image file 115 that may be sent to the institution 130 and used by the institution 130 to process a deposit of the check 110. In an implementation, the digital image file 115 may be augmented by secondary data which may be information relating to the deposit of the check 110, such as an account number and a deposit amount, for example.

For example, after endorsing the check 110, the user 105 may use a device such as the scanner 107 and/or the user computing device 109 for example, to convert the check 110 into a digital image file 115 (also referred to herein as an "image file") by making a digital image of the front side and/or back side of the check 110 and storing the digital image(s) in a digital image file 115. In an implementation, the scanner 107 may take an image of the front of the check 110. Alternatively, the scanner 107 may take an image of both the front and the back of the check 110. The back of the check 110 may provide endorsement verification, such as the signature of the person or party the check is made out to. This may also include stamps, such as checks received at a merchant.

Prior to transmitting the image file 115 to the institution 130, the user computing device 109 may analyze the data contained within the image file 115. As discussed in more detail below, the user computing device 109 may analyze the data to detect the edge(s) of the check 110, including analyzing the data by cropping the image. In response to the analysis, the user computing device 109 may output one or more aural commands.

The digital image(s) of the check 110 may be transmitted to the institution 130 in the digital image file 115. In an implementation, the user 105 may access a website associated with the institution 130 and choose to submit the digital image file 115. After the user 105 selects to submit the digital image file 115, the digital image file 115 may be streamed or otherwise provided from the user computing device 109 to the institution 130 (e.g., using an image upload component at the user computing device 109 streaming to a servlet at the institution 130).

The user computing device 109 may be decoupled from the transaction once the submission of the digital image file 115 for deposit of the check 110 is made. The transaction is thereafter managed by the institution 130. Incomplete transactions are avoided by moving the transaction processing to the server side at the institution 130 after the user 105 submits the digital image file 115. This may be referred to as an atomic deposit transaction. Any loss or severing of a communications connection between the user computing device 109 and the institution 130, such as due to browser navigation away from a web page or website of the institution 130, communication failures, user logouts, etc. on the user side, will not affect the processing and the deposit of the check 110 in the digital image file 115. Thus, the transaction will not be left in an orphaned state.

The user 105 may send the digital image file 115 and any secondary data to the institution 130 along with a request to deposit the check 110 into an account, such as the account 165. The institution 130 may process the deposit request according to the digital image file 115 and any secondary data.

Any image processing technology may be used to retrieve the digital image(s) of the check 110 from the digital image file 115. Upon receipt and processing of the digital image file 115 and approval of the information pertaining to the check 110, the institution 130 may credit the funds of the check 110 to the account 165.

The user 105 may be provided with a link (e.g., in an email, on a website, etc.) that allows the user to view past transactions. In this manner, the user 105 may determine if the transaction was successful (e.g., whether the digital image file 115 was successfully received and processed at the institution 130, whether the check 110 was processed and funds were deposited in the account 165, etc.). Additionally, the institution 130 may provide status information and/or confirmation of the success of the transaction to the user 105 via email, facsimile, instant messaging, text messaging, phone, mail, etc.

Any technique for sending the digital image file 115 to the institution 130 may be used, such as providing the digital image file 115 from storage to a website associated with the institution 130. In an implementation, the user 105 may attach the digital image file 115 to an email and send the digital image file 115 to the institution 130 using the same device used to make the digital image(s) of the check 110 or another computing device.

The user computing device 109 may be integral with the device used to make the digital image(s) and/or the digital image file 115 or separate from the device used to make the digital image(s) and/or the digital image file 115. An example user computing device 109 is described with respect to FIG. 13. For example, the user computing device 109 may include a processor or controller (or other arithmetic logic device), one or more input devices (such as a keyboard and a camera), and one or more output devices (such as a speaker or other device that generates sound or aural outputs). It is contemplated that any device that is capable of generating a digital image may be used to make one or more digital images of the check 110 which may be sent to the institution 130 as a digital image file 115. Additional devices that may be used in the generation and/or transmission of a digital image file 115 include a digital camera, a photocopier, a fax machine, and the like, for example.

The institution 130 may receive the digital image file 115 representing the check 110 and may use any known image processing software or other application(s) to obtain the relevant data of the check 110 from the digital image file 115. The institution 130 may determine whether the financial information associated with the check 110 may be valid.

For example, the institution 130 may include any combination of systems and sub-systems such as electronic devices including, but not limited to, computers, servers, databases, or the like. The electronic devices may include any combination of hardware components such as processors, databases, storage drives, registers, cache, random access memory (RAM) chips, data buses, or the like and/or software components such as operating systems, database management applications, or the like. According to an embodiment, the electronic devices may include a network-based server that may process the financial information and may receive the digital image file 115 from the user 105.

The electronic devices may receive the digital image file 115 and may perform an analysis on the quality of the image(s) of the check 110 in the digital image file 115, the readability of the data contained therein, or the like. For example, the electronic devices may determine whether the image(s) may be retrieved and combined and whether the amount payable and other information may be readable such that it may be obtained and processed by the institution 130 to credit the account 165 associated with the user 105.

Figure 2:
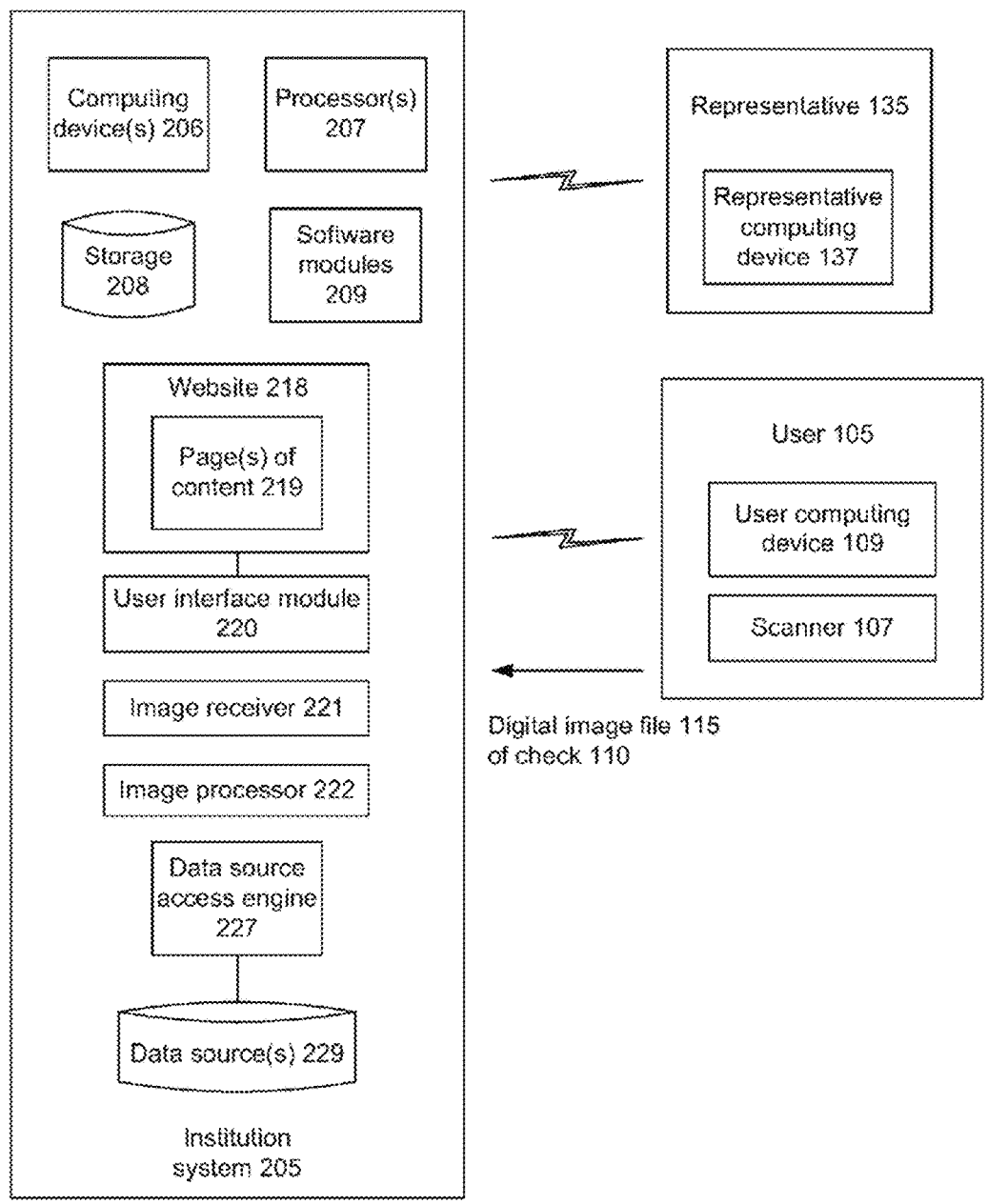
FIG. 2 is a block diagram of an implementation of a system that may be used for the deposit of a negotiable instrument.

The institution 130, in an implementation, after receiving the digital image(s) of the check 110 from the user 105, may use a clearinghouse to perform the check clearing operations. Check clearing operations are used by banks to do the final settlement of the check, such as removing funds from the account of the payor and transferring those funds to the user's bank. FIG. 2 is a block diagram of an implementation of a system that may be used for the deposit of a negotiable instrument. An institution system 205 may be associated with the institution 130 and may include a user interface module 220, an image receiver 221, an image processor 222, and a data source access engine 227. The user interface module 220 may generate and format one or more pages of content 219 as a unified graphical presentation that may be provided to the user computing device 109 or a representative computing device 137. In an implementation, the page(s) of content 219 may be provided to the user computing device 109 and/or the representative computing device 137 via a secure website 218 associated with the institution system 205.

In an implementation, the institution system 205 may use the image receiver 221 to receive the digital image file 115 of a negotiable instrument, such as the check 110, from the user 105. The image receiver 221 may receive the digital image file 115 via streaming or other communications techniques.

In an implementation, the image processor 222 may receive the digital image file 115 from the image receiver 221 or storage and may process the digital image file 115 in the processing and/or clearing of the check 110. The image processor 222 may process multiple digital images if the digital image file 115 comprises multiple digital images. For example, after receiving the digital image file 115 of the check 110, the image processor 222 may retrieve the image(s) of the check 110 using any known image processing software or other application(s) to obtain any relevant data of the check 110 from the digital image file 115.

The image processor 222 has access to data, files, and documents pertaining to the user 105 as well as any other data, files, and documents that are internal or external to the institution system 205 that may be useful in processing the digital image file 115 and/or the data contained therein.

The institution system 205 has the ability to retrieve information from one or more data sources 229 via the data source access engine 227. Data pertaining to the user 105 and/or the user account 165 and/or processing and clearing of the check 110 may be retrieved from data source(s) 229 and/or external data sources. The retrieved data may be stored centrally, perhaps in storage 208. Other information may be provided to the institution system 205 from the user 105 and/or the representative 135.

Data source(s) 229 may contain data, metadata, email, files, and/or documents that the institution system 205 maintains pertaining to the user 105, such as personal data such as name, physical address, email address, etc. and financial data such as credit card numbers and checking account numbers. Such data may be useful for processing the digital image file 115 as described herein. Additionally or alternatively, the institution system 205 may access this information when processing or clearing the check 110.

The representative computing device 137 may provide access to a system which is coupled to the institution system 205. A system may be configured to format and transmit a graphical user interface to the representative 135, and through the graphical user interface provide the representative 135 the ability to interact with information that may be maintained, requested, and/or provided by the institution system 205. As mentioned above, the institution system 205 may provide a unified graphical presentation output. In an implementation, the unified graphical presentation is combined with other materials and transmitted to the representative 135.

A user access system may be implemented as a web server in an implementation. The user access system, through the use of any suitable interactive web technology, provides an interactive experience to the user 105 and/or the representative 135 through which access to check processing and clearing data and status and related data can be accomplished. Any technology that provides interactivity through a web browser is considered to be within the scope of the present discussion and may include, without limitation, Java applet, Hyper-Text Mark-Up Language (HTML), Dynamic HTML (DHTML), JavaScript, and Ajax.

The institution system 205 may comprise one or more computing devices 206. The computing device(s) 206 may have one or more processors 207, storage 208 (e.g., storage devices, memory, etc.), and software modules 209. The computing device(s) 206, including processor(s) 207, storage 208, and software modules 209, may be used in the performance of the techniques and operations described herein.

Examples of software modules 209 may include modules that may be used in conjunction with receiving and processing a digital image file 115 comprising one or more digital images of the check 110 without further interaction or instructions from the user 105 or the user computing device 109, retrieving data from the digital image file 115, generating web page content for display, receiving instructions from the representative 135 or the user 105, and providing status information and deposit confirmation to the user 105, for example. While specific functionality is described herein as occurring with respect to specific modules, the functionality may likewise be performed by more, fewer, or other modules. An example computing device and its components are described in more detail with respect to FIG. 13. It will be appreciated that the examples herein are for purposes of illustration and explanation only, and that an embodiment is not limited to such examples.

Figure 3:
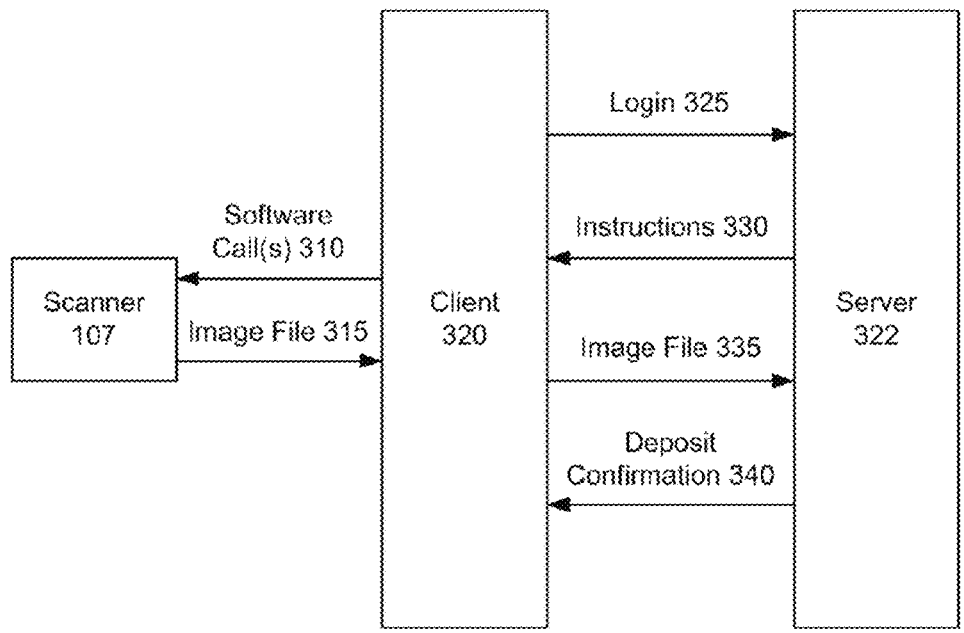
FIG. 3 shows a data-flow diagram of a system for the deposit of a negotiable instrument, in accordance with an example embodiment.

FIG. 3 shows a data-flow diagram of a system 300 for the deposit of a negotiable instrument, in accordance with an example embodiment. In the data-flow diagram, a client 320 is one example of the user computing device 109 of the user 105 described with respect to the system 100 of FIG. 1. In an implementation, a server 322 may be a software component operable by the institution 130.

The client 320 may login 325 to a remote deposit system executed on the server 322. The login 325 may serve to authenticate the user 105 as an authorized consumer of the institution 130.

The server 322, in one example, may send instructions 330 to the client 320 which execute an application on the client 320. This may include instructions which cause a software object, which may have been previously downloaded and installed on the client 320, to be executed on the client 320. In another example, the instructions 330 may include a wholly self-contained application which when delivered to the client 320 will execute and perform one or more operations described herein.

In either example, the software object may be configured to make one or more software calls 310 to the scanner 107 (or other imaging device) associated with the user computing device 109. This may be through specific software instructions to the scanner 107. In other words, the scanner's functionality may not be abstracted through any software library. In such an example, software code may be written and delivered to every different scanner.

In an alternate example, the software object may operate through a software abstraction layer, such as an application programming interface (API). The software object developer may only insert code into the software object to call one or more APIs exposed by the software operating the user computing device 109.

The software object may cause the scanner 107 to take a picture or capture one or more images of the check 110 that is being deposited. These images may be captured sequentially, e.g., pursuant to the user 105 flipping the check 110 over after an image of the front of the check 110 has been captured. However, each side of the check 110 may be captured by the scanner 107 using similar API calls. The images may be stored in an image file 315.

Once the images of one or both sides of the check 110 are captured by the scanner 107, the image file 315 may be operated on by the software object of the client 320. These operations may include any of the following: deskewing, dewarping, magnetic ink character recognition (MICR), cropping (either automatically, or having the user 105 manually identify the corners and/or edges of the check 110 for example), reducing the resolution of the image, number detection, character recognition, and the like.

One or more software objects on the client 320 may operate by performing one or more of the operations described herein and then transmitting an image file 335 (e.g., based on image file 315 that has been processed) to the server 322 after the user 105 submits that they do wish to deposit the check 110. Alternatively, the software object(s) may capture the image(s) of the check 110 and transmit the image(s) to the server 322 which in turn may perform those operations and verify that the image quality is within acceptable thresholds. In this example, the image(s) transmitted to the server 322 may be in any format, such as Joint Photographic Experts Group (JPEG) or tabbed image file format (TIFF), insofar as the server software has the ability to convert the image(s) into a Check 21 compliant format. Alternatively, the server 322 may output an X9.37 file to the clearing system. The Check Clearing for the 21st Century Act (or Check 21 Act) is a United States federal law that allows the recipient of a paper check to create a digital version, thereby eliminating the need for further handling of the physical document. The Check 21 standard for electronic exchange is defined in the standard DSTU X9.37-2003 ("X9.37").

In an implementation, on the server side, more operations may be performed, such as signature verification. However, the present discussion is not limited in any way by discussion of where certain operations are described as operating. The operations of detecting and verifying information may be performed by the client 320 before the information is transmitted along with the image(s) in the image file 335 to the server 322. Alternatively, the software object operating on the user computing device 109 may perform no operation other than capturing images of the front and back of the check 110 and transmitting those images to the server 322, wherein the server 322 performs processing and deposit of the check without any further instructions or interactions with the client 320 after receiving the image(s) from the client 320.

In an implementation, after the server 322 has received the image file 335, the client 320 may be decoupled from the transaction such that the server 322 manages the transaction and no further instructions or information is received or requested from the client 320 prior to processing and deposit of the check. The server 322 may retrieve the image(s) of the check from the image file 335 and process the check for deposit into an account of the user. Such an atomic deposit transaction avoids an incomplete transaction which may have otherwise occurred due to a subsequent communication problem between the client 320 and the server 322. At some point, the server 322 may provide a deposit confirmation 340 to the user, e.g., via the client 320.

Figure 4:
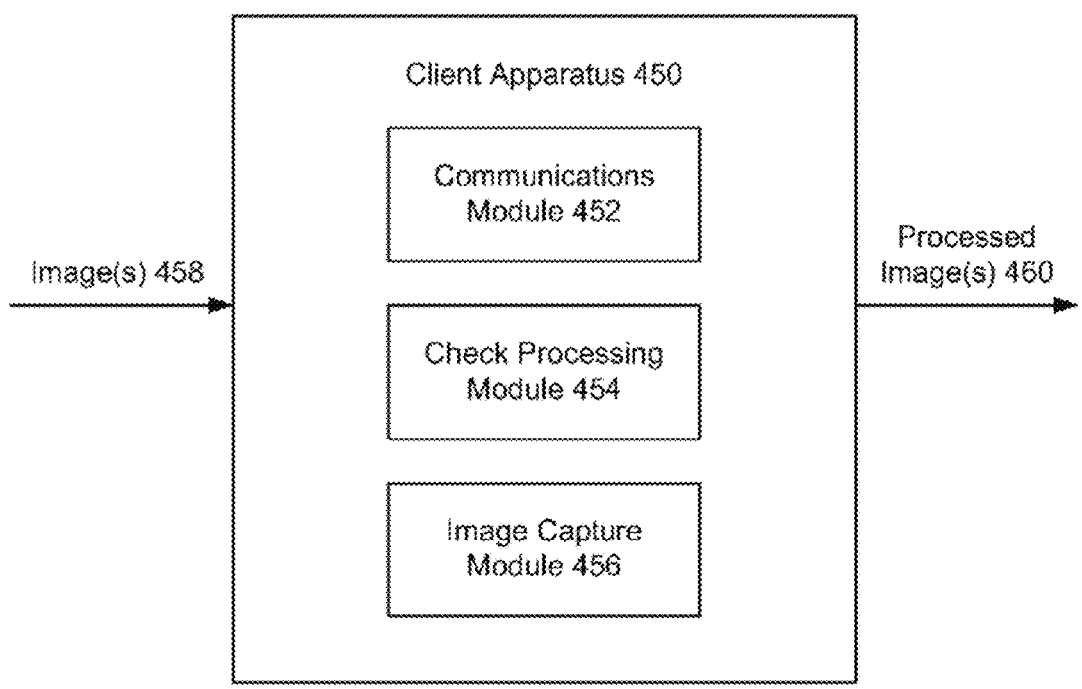
FIG. 4 shows a block diagram of a client apparatus for the deposit of a negotiable instrument, in accordance with an example embodiment.

FIG. 4 shows a block diagram of a client apparatus 450 for the deposit of a negotiable instrument, in accordance with an example embodiment. The client apparatus 450 may include one or more software objects operating on the client 320. The client apparatus 450 may include a communications module 452, a check processing module 454, and an image capture module 456. The client apparatus 450 may receive, in one example, one or more images 458 as an input and output one or more processed images 460.

In an implementation, the image(s) 458 may be received following a software call from the check processing module 454 to the image capture module 456. In such an implementation, the image capture module 456 may include the scanner 107 (or other imaging device) alone or in conjunction with a user computing device 109. The scanner 107 may be detachably coupled to the user computing device 109 such as through a secure digital (SD) slot or over any suitable communications bus, such as USB (universal serial bus).

Figure 5:
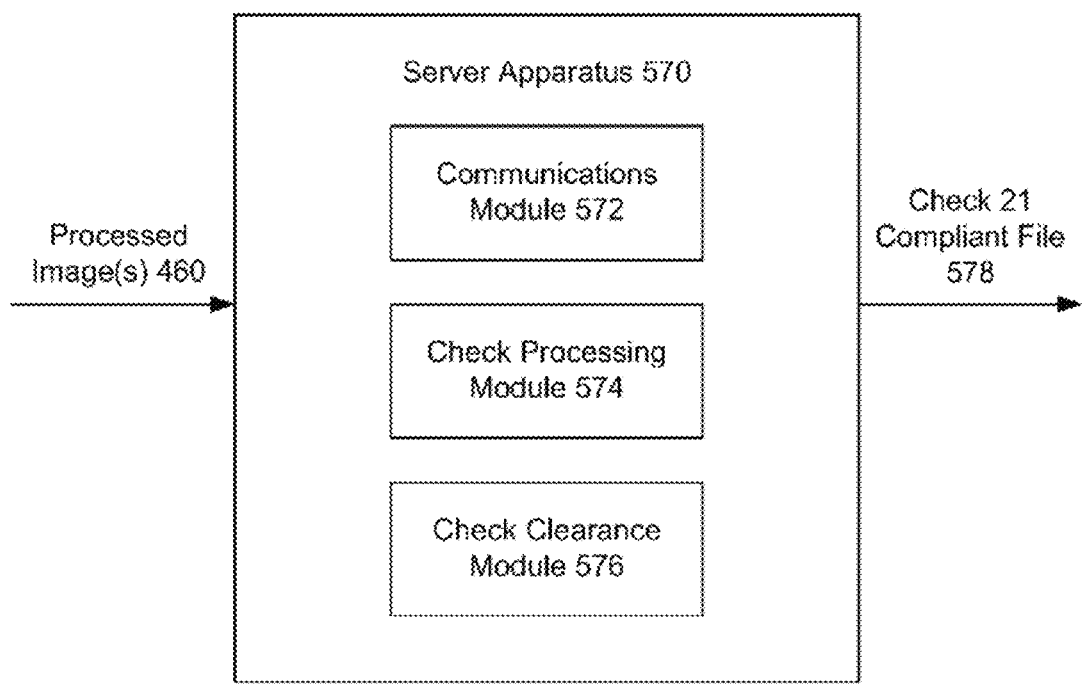
FIG. 5 shows a block diagram of a server apparatus for the deposit of a negotiable instrument, in accordance with an example embodiment.

In an implementation, the image capture module 456 may retrieve previously captured and stored image files (e.g., in local, remote, or removable storage associated with the client apparatus 450) and send the image files to an entity (e.g., institution 130, the server 322, the server apparatus 570 of FIG. 5, etc.) for processing.

In an implementation, the client apparatus 450 may comprise a browser such as a web browser, for accessing a website on the Internet or other network associated with an institution. The user may access the website and select a "capture image" link or similar icon, button or link, for example, displayed on the browser. Such a selection may call the image capture module 456 on the client apparatus 450.

The communications module 452 may be configured, in one example, to receive and send data signals over a suitable communications network. This may include, without limitation, GSM/GPR3, HSDPA, CDMA, TDMA, 802.11, 802.16 and the like. With respect to the present discussion, the communications module 452 may receive one or more processed images 460 from the check processing module 454 and may transmit them over a suitable communications network to the institution 130, as described herein, e.g., pursuant to the user selecting a "submit image" link or similar icon, button or link, for example, displayed on the browser.

The check processing module 454 may be configured, in one example, to cause the image capture module 456 to capture a digital image of at least one side of a negotiable instrument such as a check. The check processing module 454 may then perform one or more cleaning operations on the image of the check. These cleaning operations, at a high level, are intended to ensure that the image of the check is suitable for one or more processing tasks. For instance, if the check is rotated 45 degrees clockwise when captured, the check processing module 454 or a software object operated on the server 322 described above may be unable to optically detect information on the check. In this example, the check processing module 454 may deskew the image such that the image is no longer rotated.

Another aspect of an image that may be cleaned is a warping of the image. Warping, as used herein, is meant to denote that the check is tilted forward or back with respect to a plane that is perpendicular to a line drawn from the camera lens (e.g., of the scanner or other imaging device) to the center of the check. Warping, or tilting, of the image may also lead to incorrect optical detection of the check. In an implementation, the check processing module 454 may dewarp the image such that, in a three-dimensional space, the check would appear to be perpendicular to an imaginary line drawn from the center of the camera lens to the center of the check itself.

The check processing module 454, in further examples, may perform one or more other cleaning or processing operations. This may include down-converting the image received from the image capture module 456 to a suitable size, such as 200 dots per inch (DPI) resolution or in a resolution range such as 200 DPI to 400 DPI, 300 DPI to 500 DPI, etc., and/or converting the image to grayscale or black and white.

Alternatively, the check processing module 454 may send instructions to the image capture module 456 to cause the image capture module 456 to capture an image of the check at a particular resolution. The check processing module 454 may additionally perform any of the following operations, in further examples: convert from JPEG to TIFF, detect check information, perform signature detection on the image of the check, and the like. The check processing module 454 may, alternatively, send the captured image(s) to the server described herein for such processing and subsequent deposit of the check into an account of the user.

FIG. 5 shows a block diagram of a server apparatus 570 for the deposit of a negotiable instrument, in accordance with an example embodiment. The server apparatus 570 may include one or more software objects operating on the server 322. The server apparatus 570 may include a communications module 572, a check processing module 574, and a check clearance module 576. The server apparatus 570 may receive one or more processed images 460 from the client apparatus 450 as an input and may output a file such as a Check 21 compliant file 578. The Check 21 compliant file 578 may be a file or entry in a record set which is compliant with the clearinghouse rules set forth in the Check 21 Act and may include outputting an X9.37 file, in one example.

The communications module 572 may be configured to receive a wireless communication from the user computing device 109 over any suitable communications network, such as those described above. The check processing module 574 may be configured, in one example, to perform one or more check processing operations on the processed image(s) 460 that are received. In an implementation, these operations may include any of the operations described herein with respect to the check processing module 454 of FIG. 4. The operation of signature verification may be performed by the check processing module 574 of the server apparatus 570 as the server apparatus 570 may interface with other systems of the institution 130 that may maintain previously verified signature samples of the user 105.

A cropped grayscale image may be sent to the server apparatus 570. The server apparatus 570 may perform further processing to remove distortion such as warping. The server apparatus 570 may extract information via a TIFF conversion and determine the DPI and re-scale to another DPI (e.g., convert to TIFF and detect the DPI that was used in the grayscale image). In an implementation, DPI detection may run on the client apparatus 450.

The check clearance module 576 may be configured, in one example, to receive a file from the check processing module 574 and may communicate with a check clearinghouse such that a Check 21 compliant file 578 may be delivered to a check clearinghouse and funds may be received by the institution 130.

FIG. 6A shows a field of view 600 of a camera and an alignment guide 602 within the field of view 600. The field of view 600 may comprise the image as viewed on the display of the mobile device. Further, as shown in FIG. 6A, the alignment guide 602 is less than the entire field of view 600. Alternatively, the alignment guide 602 is co-extensive with the field of view 600. FIG. 6A further illustrates partitions, including horizontal partition 604 and vertical partition 606. Using horizontal partition 604 for alignment guide 602 results in two partitions, including an upper half of the alignment guide 602 and a lower half of the alignment guide 602. Similarly, using vertical partition 606 for alignment guide 602 results in two partitions, including a left half of the alignment guide 602 and a right half of the alignment guide 602. Further, using both horizontal partition 604 and vertical partition 606 results in the alignment guide divided into 4 quadrants. As discussed in detail below, the image data for the different partitions may be analyzed to determine whether edge(s) of the check are present within a respective partition.

To increase the likelihood of capturing a digital image of the negotiable instrument that may be readable and processed such that the negotiable instrument can be cleared, an alignment guide may be provided in the field of view of the camera of the user computing device 109. In one example, the field of view is that part of the world that is visible through the camera at a particular position and orientation in space; objects outside the field of view when the image is captured are not recorded in the image. The user may move the camera or the negotiable instrument until the negotiable instrument is viewed within the alignment guide in the field of view of the camera. The digital image of the negotiable instrument may then be captured. The alignment guide may thus provide a pre-image capture quality check that helps reduce the number of non-conforming images of checks during presentment of the images to a financial institution for processing and clearing.

In an implementation, an alignment guide 602 may be provided within the field of view 600 of the camera, e.g., using a software application running on the user computing device 109. In one example, the alignment guide may be provided during image capture to assist the user 105 in positioning the negotiable instrument so that the image of the negotiable instrument may be captured in such a manner that it may be more easily processed and cleared during subsequent operations, such as those involving one or more financial institutions.

The alignment guide 602 may be overlaid on the camera feed of the user computing device 109, in an implementation. The alignment guide 602 is provided in FIG. 6A as a four-sided bounding box (e.g., a rectangle), but any shape(s) or indicator(s) may be used, such as vertical bars, parallel lines, a circle, a square, a bounding rectangle, or a self-crop tool, for example. Any aspect ratio may be used for the alignment guide, and in an implementation, the aspect ratio may correspond to that of a personal check or a business check.

As illustrated in FIG. 6A, the image may be provided in the field of view of the camera, scanner 107 (or the like) during image capture of the negotiable instrument. As discussed in more detail below, responsive to voice instructions, the user 105 may move the camera, scanner 107 (or the like) so that the image of the negotiable instrument appears within or lines up with the alignment guide 602.

When the image of the negotiable instrument is within the alignment guide 602 (e.g., the edges of the image of the negotiable instrument are aligned with respect to the alignment guide 602, such as parallel to the associated portion of the alignment guide 602), the image of the negotiable instrument 701 that is within the alignment guide 602 may be captured either automatically (e.g., by the camera or the user mobile device under direction of an application running on the camera or the user mobile device or the financial institution) or manually (e.g., by the user 105 pressing a button or making a selection on the camera or scanner 107 or the user mobile device 109).

The institution system 205, in one example, may send instructions to the user computing device 109 that execute an application on the user computing device 109. This may include instructions that cause a software object, which may have been previously downloaded and installed (e.g., pre-installed) on the user computing device 109, to be executed on the user computing device 109. The software object may generate and display an alignment guide, such as the alignment guide 602, in the field of view of a digital camera, such as the camera or scanner 107 associated with the user computing device 109.

In another example, the instructions may include a wholly self-contained application that when delivered to the user computing device 109 will execute and perform one or more operations described herein, such as those directed to generating and displaying an alignment guide in the field of view of the camera or scanner 107. In either example, the software object may be configured to make one or more software calls to the camera or scanner 107. This may be through specific software instructions to the camera. In other words, the camera's functionality may not be abstracted through any software library. In such an example, software code may be written and delivered to every different camera-equipped mobile phone.

In an implementation, the positioning of the negotiable instrument in the image 701 may be compared with an alignment guide (which may or may not be visible to the user 105 in the field of view 600 of the camera). For example, measurements may be made by a processor in the camera, scanner 107, the user computing device 109, or a computing device at the financial institution to determine the negotiable instrument's position with respect to the alignment guide. The measurements may be compared to predetermined measurements or values to determine whether the negotiable instrument's positioning in the image is proper or sufficient for further processing of the image. As discussed in more detail below, edge detection and/or corner detection may be used in such measurements (e.g., cropping one or more parts of the image 701 of the negotiable instrument). In an implementation, corner detection itself may be a monitoring criterion, such that if corner detection of the negotiable instrument in the image is achieved, then it may be concluded that the image may be properly processed and cleared by a depository (i.e., the image passes the monitoring criteria).

Figure 6B:
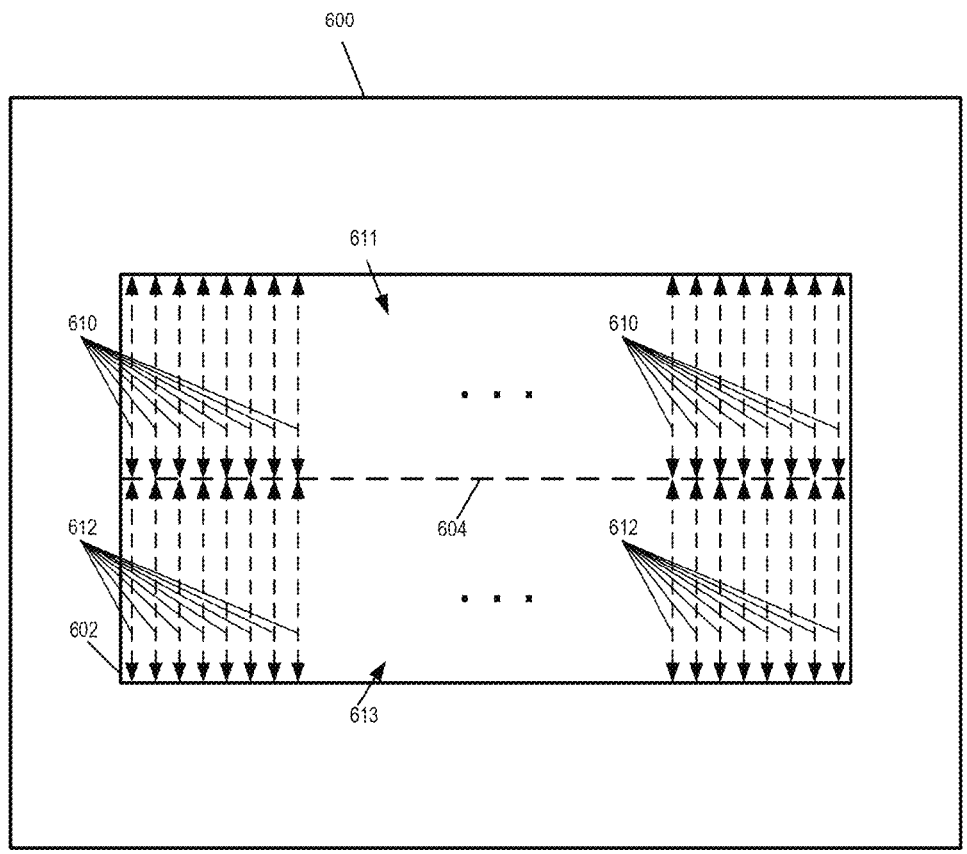
FIG. 6B shows a first example of processing top and bottom sections of pixels in the alignment guide.
Figure 6C:
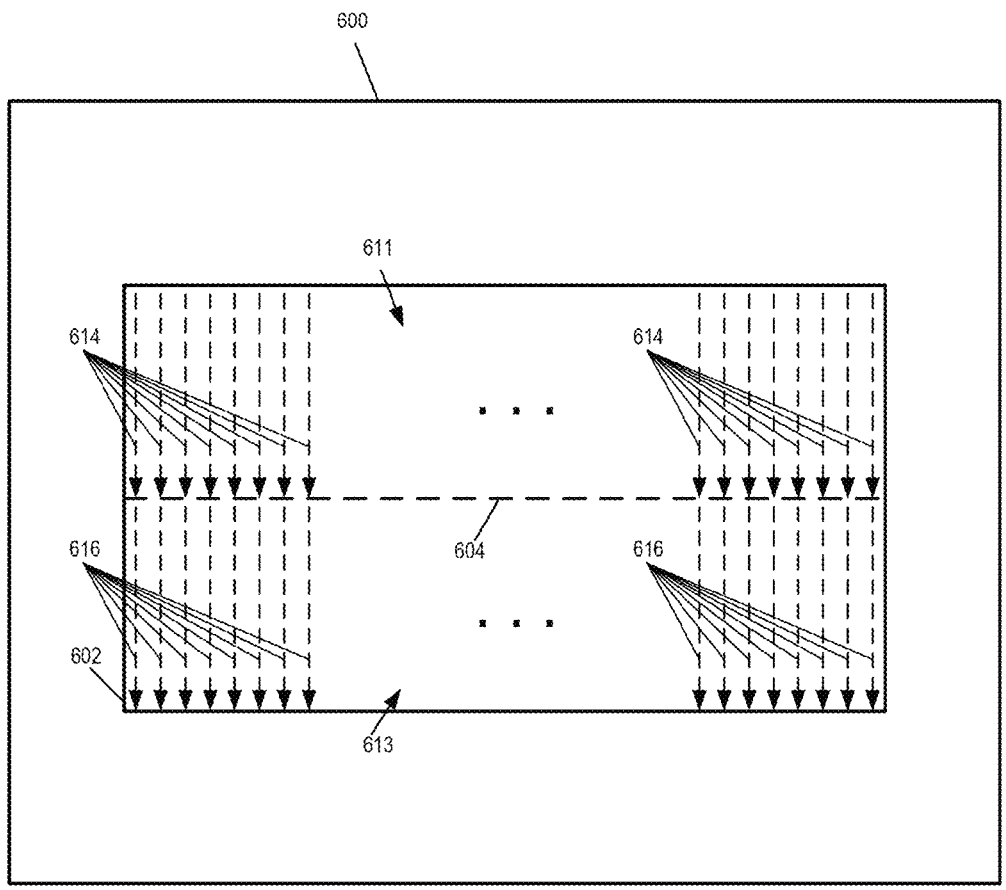
FIG. 6C shows a second example of processing top and bottom sections of pixels in the alignment guide.

As discussed in more detail below, the alignment guide may be used to determine whether the negotiable instrument is properly placed with respect to the camera. If the negotiable instrument is outside of the alignment guide 602 in the field of view 600, one or more vocal commands may be generated and provided to the user 105 including instructions for moving the camera or scanner 107 in order to properly align the negotiable instrument in the field of view. FIG. 6B shows a first example of processing a top section 611 and a bottom section 613 of pixels in the alignment guide 602. Each of top section 611 and bottom section 613 include pixels therein (e.g., columns of pixels, as shown in FIG. 6B). In one aspect, the pixels within the different sections are analyzed. For example, each column of pixels is examined in multiple directions (e.g., from top to bottom and then from bottom to top, or from bottom to top and then from top to bottom), such as multiple directions 610 in top section 611 and multiple directions 612 in bottom section 613, in order to determine whether an edge is detected in the respective column. As discussed in more detail below, there are several types of analysis of the pixels to determine whether the value at a respective pixel indicates an edge of the negotiable instrument. FIG. 6C shows a second example of processing top section 611 and bottom section 613 of pixels in the alignment guide 602. For example, each column of pixels is examined in a single direction (e.g., from top to bottom), such as single directions 614 in top section 611 and single direction 616 in bottom section 613, in order to determine whether an edge is detected in the respective column.

Figure 6D:
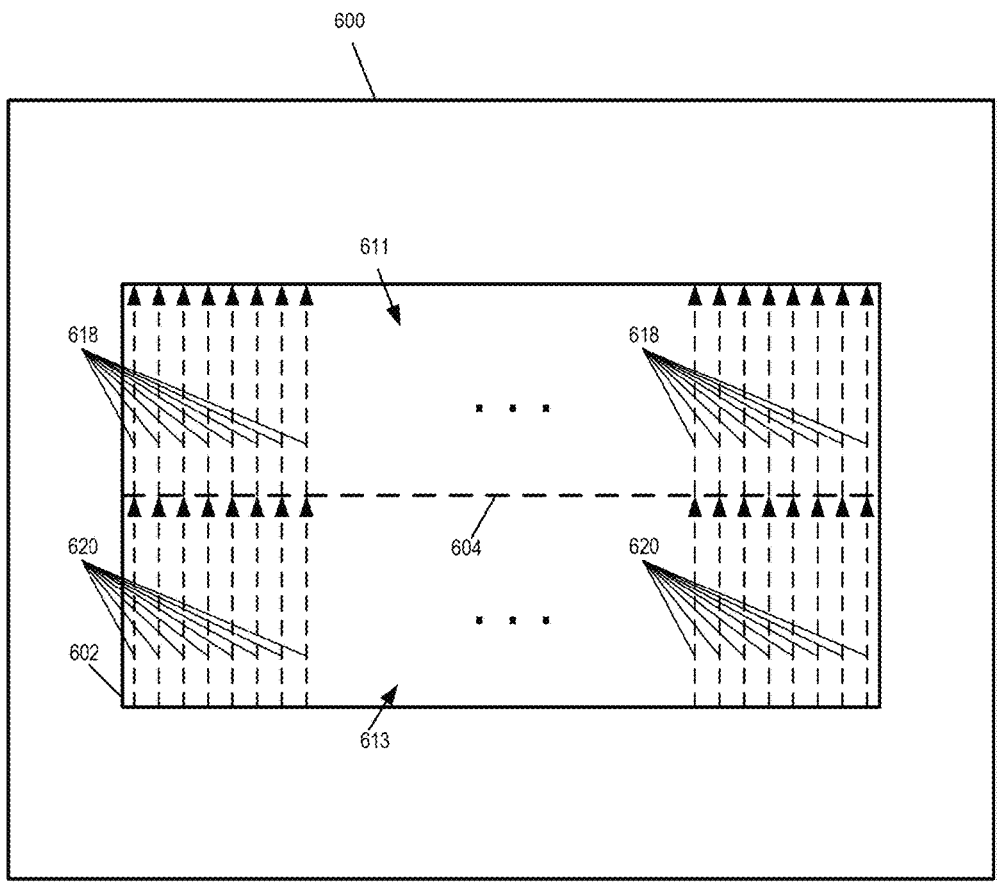
FIG. 6D shows a third example of processing top and bottom sections of pixels in the alignment guide.

FIG. 6D shows a third example of processing top section 611 and bottom section 613 of pixels in the alignment guide 602. Similar to FIG. 6C, the columns of pixels are examined in a single direction, but from bottom to top. In particular, the analysis includes single directions 618 in top section 611 and single direction 620 in bottom section 613, in order to determine whether an edge is detected in the respective column.

Figure 6E:
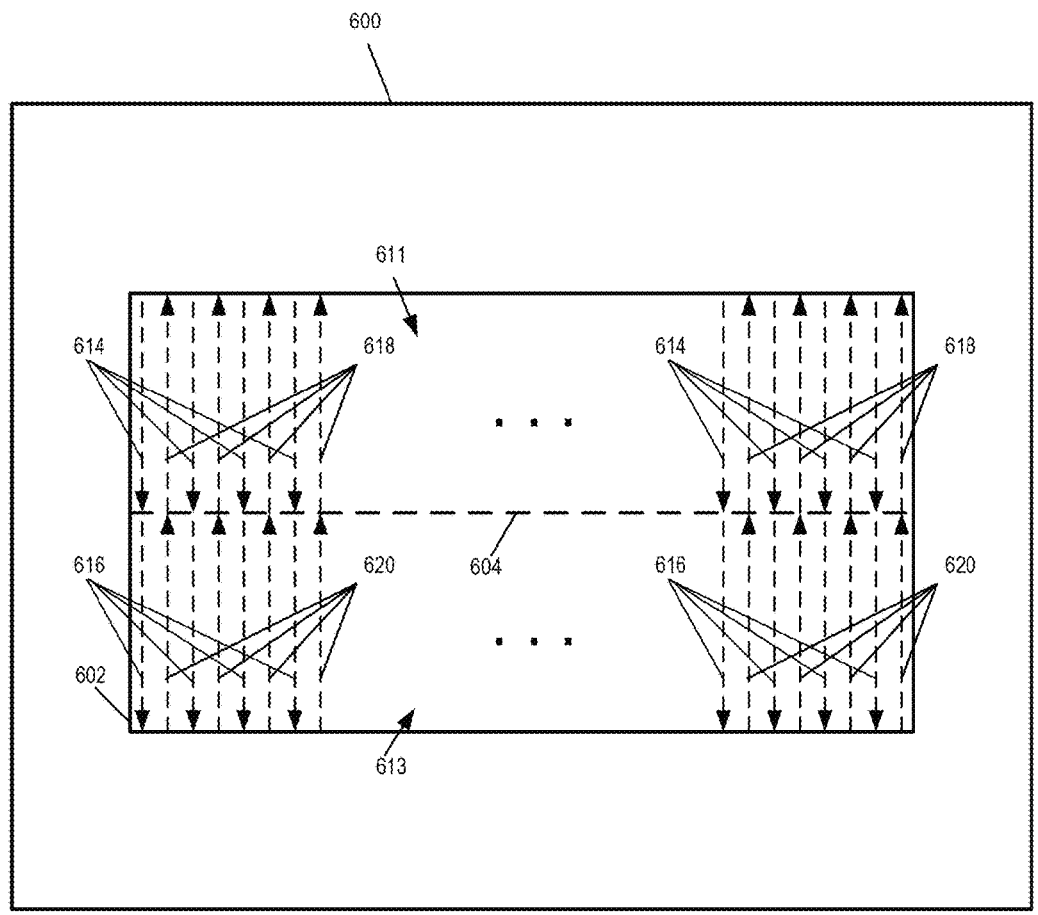
FIG. 6E shows a fourth example of processing top and bottom sections of pixels in the alignment guide.

FIG. 6E shows a fourth example of processing top section 611 and bottom section 613 of pixels in the alignment guide 602. As shown, each column is analyzed in one direction, with different columns being analyzed in different directions. In particular, the direction of analysis alternates column-by-column. For example, the analysis of the top section 611 alternates from top to bottom 614 and bottom to top 618. Likewise, the analysis of the bottom section 613 alternates from top to bottom 616 and bottom to top 620.

Figure 6F:
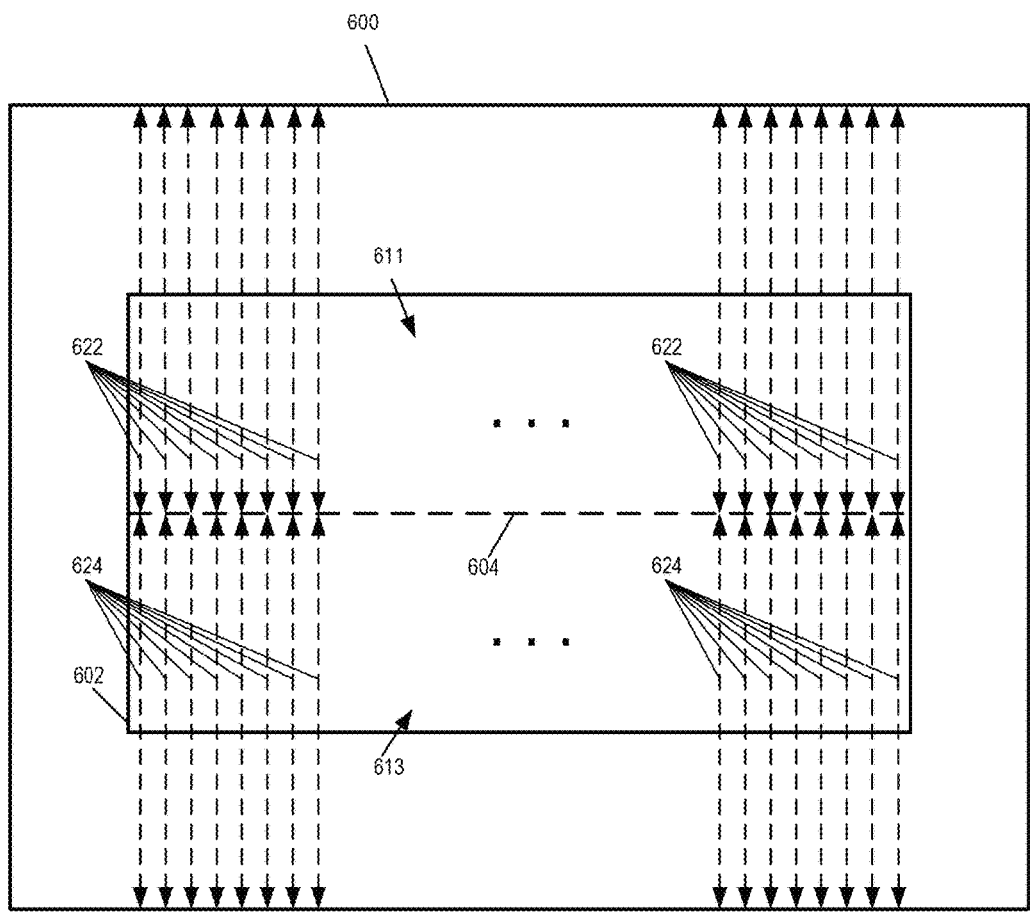
FIG. 6F shows a first example of processing top and bottom sections of pixels inside and outside the alignment guide.

FIG. 6F shows a first example of processing top section 611 and bottom section 613 of pixels inside and outside the alignment guide 602. As discussed above, the alignment guide 602 may not be coextensive with the entire field of view 600. In this instance, the analysis of the pixels need not be limited to pixels within the alignment guide 602. As shown in FIG. 6F, each column of pixels is examined in multiple directions (e.g., from the top of the field of view 600 to the horizontal partition 604 and then from the horizontal partition 604 to the top of the field of view 600, or from the horizontal partition 604 to the top of the field of view 600 and then from the top of the field of view 600 to the horizontal partition 604), such as multiple directions 622 in top section 611 and multiple directions 624 in bottom section 613, in order to determine whether an edge is detected in the respective column.

Figure 6G:
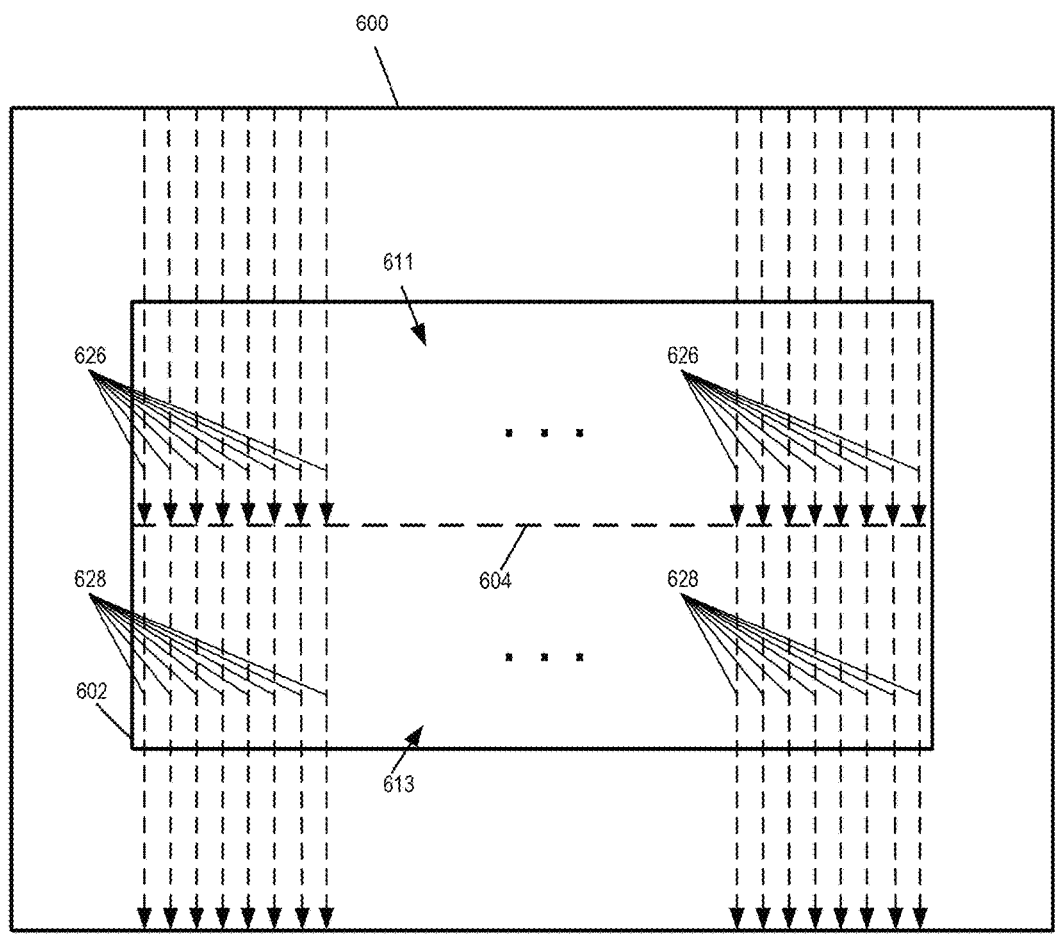
FIG. 6G shows a second example of processing top and bottom sections of pixels inside and outside the alignment guide.

FIG. 6G shows a second example of processing top section 611 and bottom section 613 of pixels inside and outside the alignment guide 602. As illustrated, each column of pixels is examined in a single direction (e.g., from the top of the field of view 600 to the horizontal partition 604), such as single directions 626 in top section 611 and single direction 628 in bottom section 613, in order to determine whether an edge is detected in the respective column. Analysis similar to that disclosed in FIGS. 6D-E may be performed.

Figure 6H:
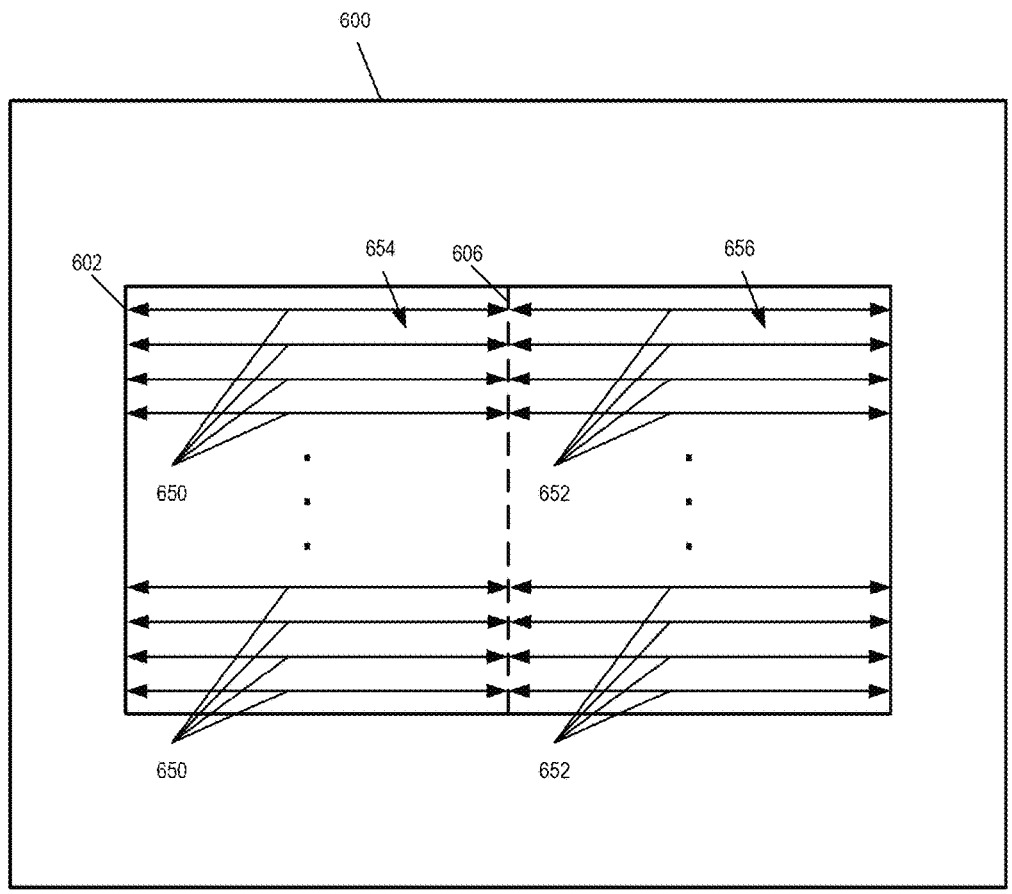
FIG. 6H shows an example of processing right and left sections of pixels in the alignment guide.

As discussed above, the alignment guide 602 may be divided in multiple ways. One way is in right and left sections. In particular, FIG. 6H shows an example of processing left section 654 and right section 656 of pixels in the alignment guide 602. Similar to the discussion above, left section 654 and right section 656 include rows of pixels. The rows of pixels may be analyzed in a variety of ways, such as in one direction or in multiple directions. FIG. 6H illustrates each row of pixels being examined in multiple directions (e.g., from right to left and then from left to right, or from left to right and then from right to left), such as multiple directions 650 in left section 654 and multiple directions 652 in right section 656, in order to determine whether an edge is detected in the respective row. Similar to the discussion above with respect to FIGS. 6C-G, the analysis of the rows may be in a single direction for each row, multiple directions, alternate directions, or the like. Further, the analysis of the rows may be contained within alignment guide 602 or outside of alignment guide 602.

Figure 7A:
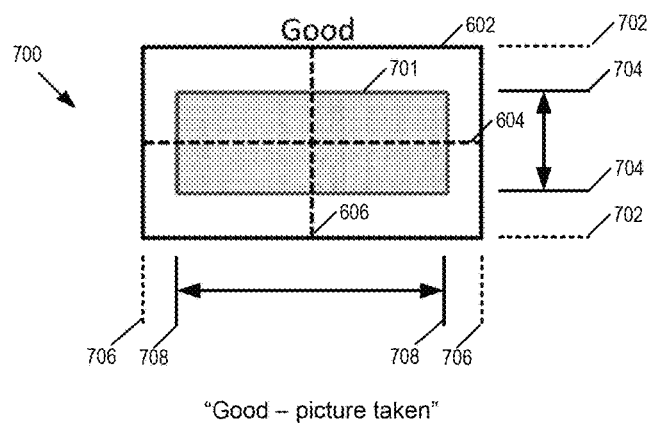
FIGS. 7A-C show an alignment guide and a negotiable instrument within the alignment guide indicating no zoom is recommended, with FIG. 7A illustrating proper alignment and FIGS. 7B-C illustrating left movement is recommended.

FIG. 7A is an illustration 700 a negotiable instrument 701 proper aligned within the alignment guide 602 in a field of view. As discussed in more detail below, various aspects within the field of view may be determined. For example, the number of edges of the negotiable instrument 701 may determine whether to zoom in, zoom out, or not zoom at all. Further, cropping of the image may be analyzed to determine whether and how to instruct movement of the camera or scanner 107.

Figure 12A:
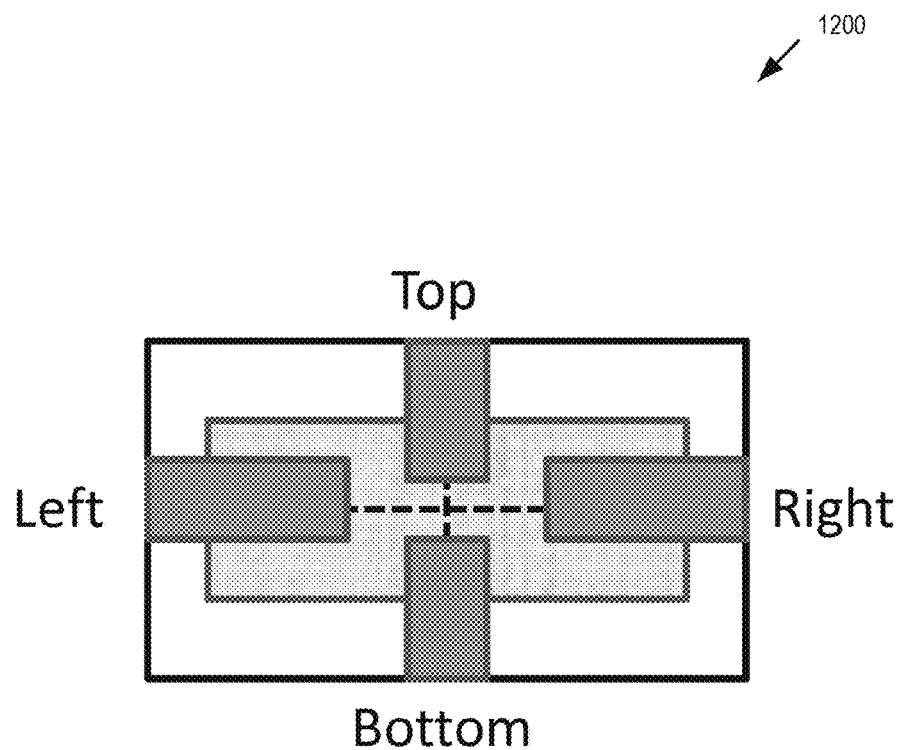
FIG. 12A includes one example of cropping sections of the image.
Figure 12B:
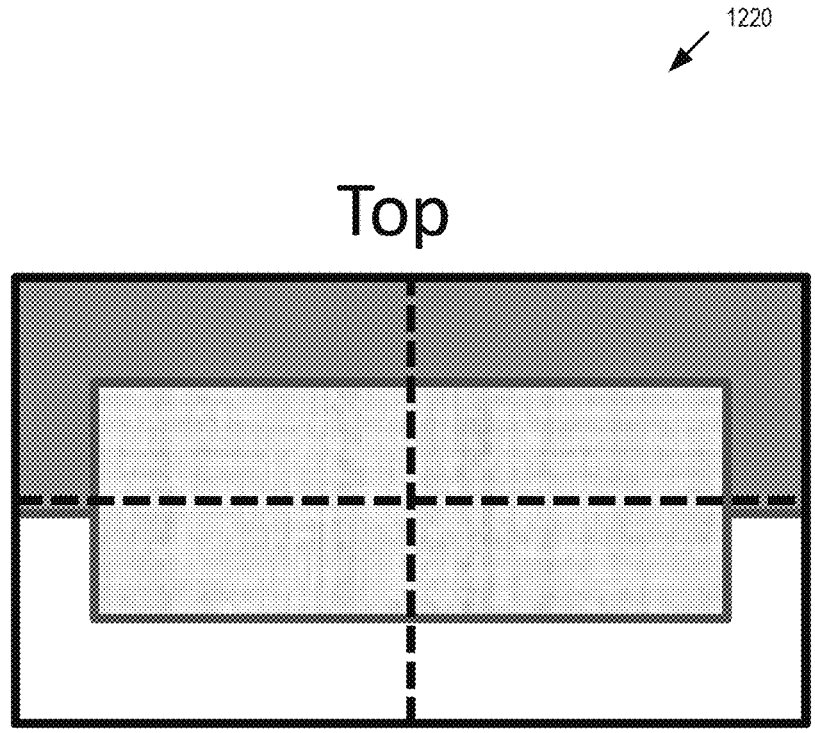
FIGS. 12B-E includes another example of cropping sections of the image, in which for each edge, half of the image is taken as the sample size.
Figure 12C:
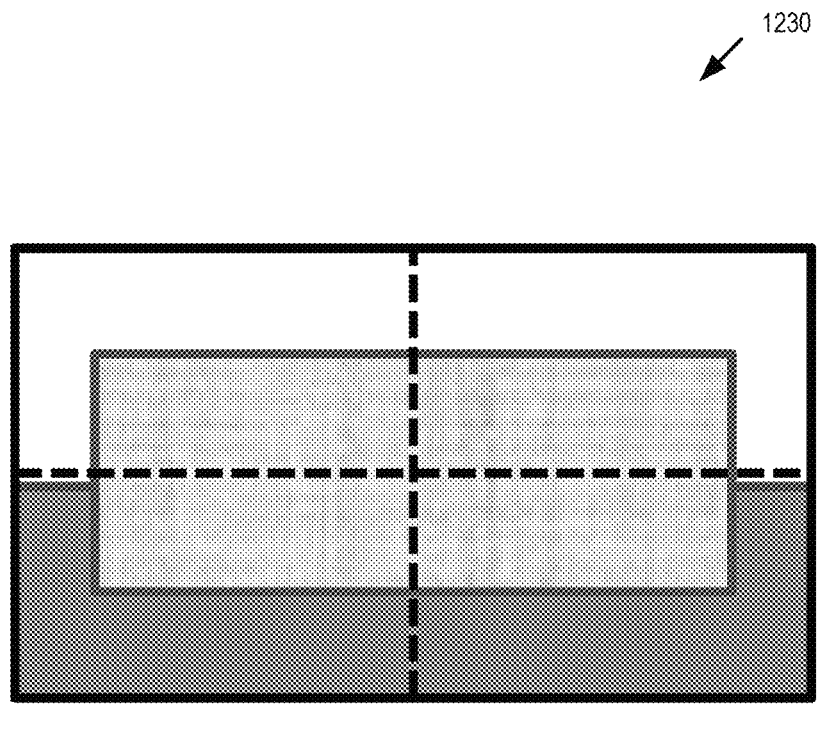
Figure 12D:
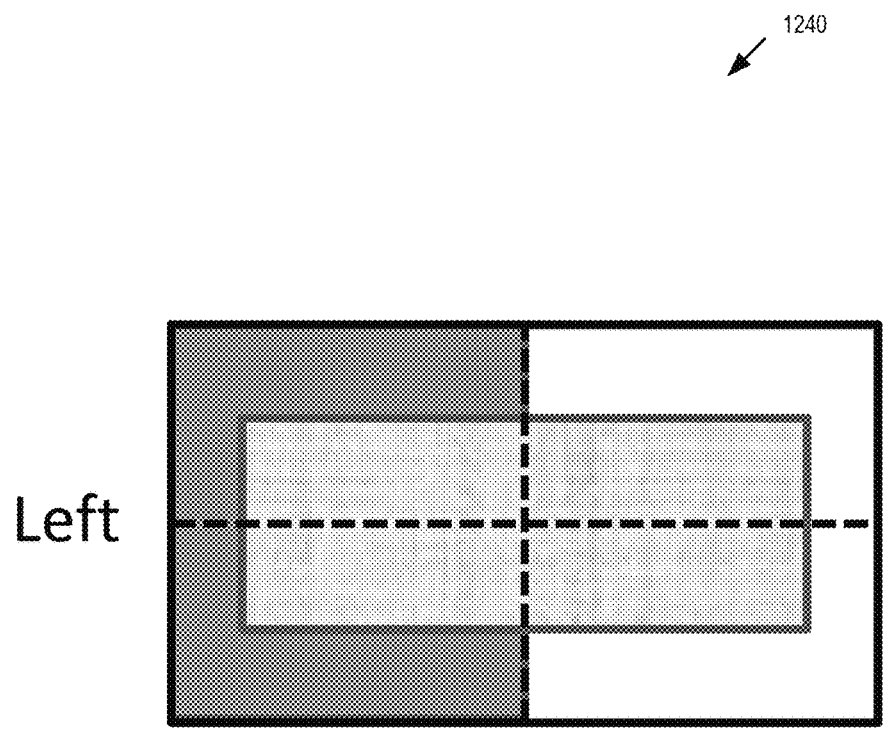
Figure 12E:
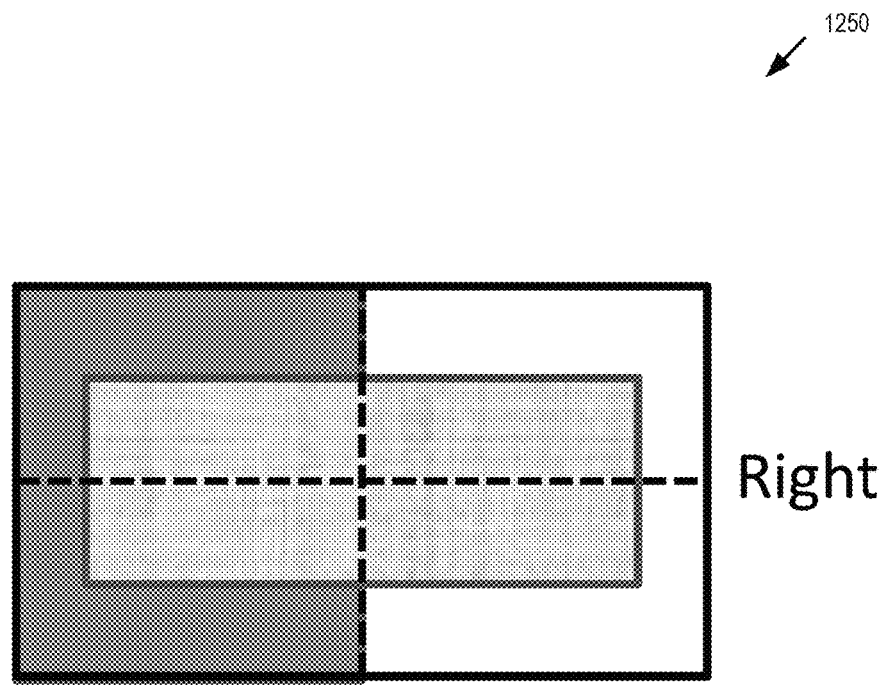

For example, for each potential edge, a portion of the image is taken as a sample size. In one example, depicted in FIG. 12A, sections of the image are cropped. In particular, for each edge, a small sample size of the image of the check (illustrated in dark) is analyzed to determine whether there is variance between light and dark pixels in the sample size. If variance is detected, the edge is determined to have been found.

As another example, depicted in FIGS. 12B-E, sample sections of the image are cropped, in which for each edge, half of the image is taken as the sample size. The logic determines whether variance is detected in the sample section. If variance is detected (e.g., a difference in the values of the pixels to illustrate a transition from light to dark pixels or from dark to light pixels), the variance is further analyzed. In particular, it is determined whether the variance is "normal" or "inverted". For example, looking outside-in, in the event that black pixels are seen first and thereafter white pixels, the variance is determined to be "normal." In contrast, in the event that white pixels are seen first and thereafter black pixels, the variance is determined to be "inverted". This assumes that the negotiable instrument is taken on a dark background, whereby the negotiable instrument in the image is substantially lighter than the background.

Figure 12F:
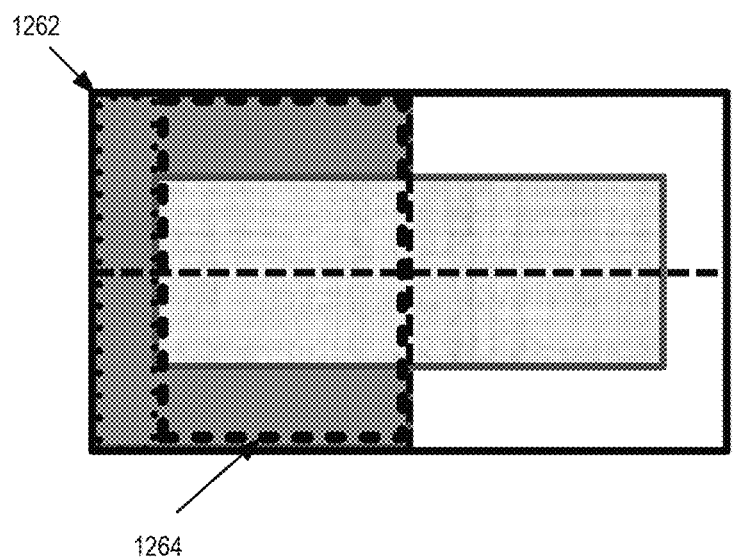
FIG. 12F is an illustration of how the position of the camera in proportion to the image detects a side as "normal"
Figure 12G:
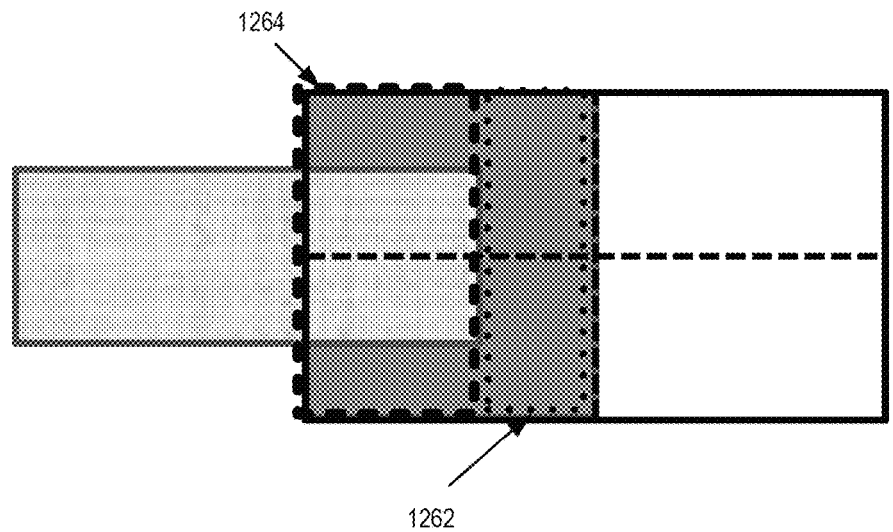
FIG. 12G is an illustration of how the position of the camera in proportion to the image detects a side as "inverted"

FIG. 12F is an illustration of how the position of the camera in proportion to the image detects a side as "normal". In particular, the position of the camera in proportion to the negotiable instrument image, which area 1262 as background image and area 1264 as negotiable instrument image, may detect that the image depicted in FIG. 12F shows that the left edge is "normal". Conversely, FIG. 12G is an illustration of how the position of the camera in proportion to the image detects a side as "inverted". In particular, the position of the camera in proportion to the negotiable instrument image, which area 1262 as background image and area 1264 as negotiable instrument image, may detect that the image depicted in FIG. 12F shows that the left edge is "inverted".

Thus, for each potential edge, a determination may be made as to whether the potential edge is "normal" or "inverted". These determinations may provide multiple sources, such as 8 sources, to input to a decision matrix. The sources include: (1) left found; (2) left invert found; (3) right found; (4) right invert found; (5) top found; (6) top invert found; (7) bottom found; and (8) bottom invert found. FIG. 7Z illustrate a table of inputs to the decision engine (including multiple sources of inputs of (1) left found; (2) left invert found; (3) right found; (4) right invert found; (5) top found; (6) top invert found; (7) bottom found; and (8) bottom invert found) and outputs of the decision engine (including aural outputs to generate based on the inputs).

Alternatively, distances of the edges of the negotiable instrument relative to one another and/or relative to the distances of the edges of the alignment guide 602 may be examined to determine whether the negotiable instrument 701 is properly aligned within the alignment guide 602. For example, a distance of a vertical edge of the negotiable instrument 701 (designated as the arrow between 704) may be compared to a distance of a vertical edge of the alignment guide 602 (designated as between 702). Likewise, a distance of a horizontal edge of the negotiable instrument 701 (designated as the arrow between 708) may be compared to a distance of a vertical edge of the alignment guide 602 (designated as the arrow between 706). Though the distances of only two sides are shown in FIG. 7A, distances for all of the detected sides of the negotiable instrument 701 may be determined (such as each of the 4 detected sides). Alternatively, distances for less than all of the detected sides of the negotiable instrument 701 may be determined (such as each of 2 detected sides (shown in FIG. 7A), or each of 3 detected sides).

Distances may be determined in one of several ways. In one way, the distance may be calculated by a number of pixels. For example, the distance designated as the arrow between 704 may be determined based on the number of pixels between lines 704. In response to determining that the placement of the negotiable instrument 701 relative to the camera is good (e.g., the negotiable instrument is within the alignment guide, such as illustrated in FIG. 7A), the user computing device 109 may output an aural indication. The aural indication may comprise a command for the user to "hold the camera steady".

Alternatively, as illustrated in FIG. 7A, the aural indication may comprise "Good—picture taken". Thus, the automatic capture after proper alignment may be achieved through the audible instructions to the user, and may take place after a number of consecutive frames of the video have been shown that the negotiable instrument is within the appropriate boundary. Depending on the processing speed and video capture speed of the mobile device, the number of consecutive frames prior to capturing the image may vary. In one example, the time necessary to maintain the negotiable instrument within the borders of the alignment guide 602 for automatically capturing a still image of the document is less than one second. The automatically captured still image of the negotiable instrument may then be transferred to a remotely located server over a wireless or wired communication network, such as discussed above.

Figure 7B:
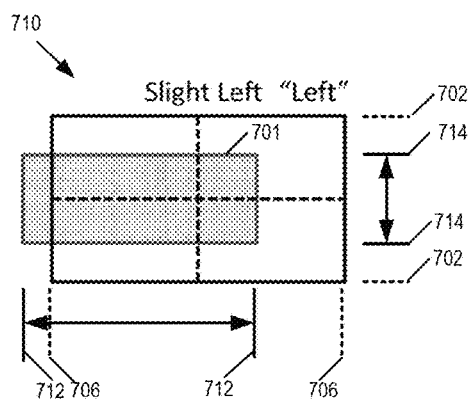
Figure 7C:
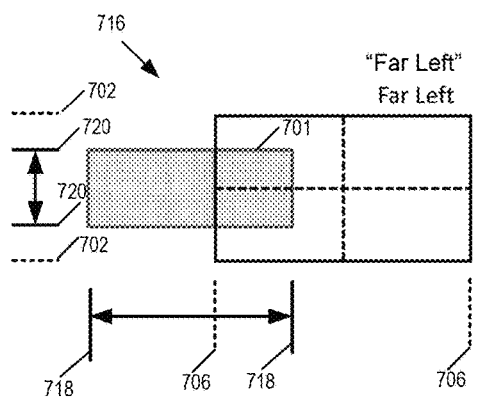

FIGS. 7B-C both illustrate that movement of the camera to the left is recommended. FIG. 7B is an illustration 710 that three sides of the negotiable instrument 701 are detected. Various distances with regard to FIG. 7B may be calculated. For example, a distance between line 706 and line 712 may be calculated. Alternatively, in the event that the field of view 600 is larger than the alignment guide 602, the distance between lines 712 may likewise be calculated. Further, a distance between lines 714 may be calculated. As discussed above, the distances for the various sides within the alignment guide 602 and/or within the field of view 600 may be compared with one another and/or may be compared with distances of the alignment guide (e.g., the distance between lines 702 or the distance between lines 704) in order to determine whether to zoom in/out or whether to move the camera. For example, the distance between lines 714 may be compared with the distance between lines 706 and 712. Further, the distance between lines 714 may be compared with the distance between lines 702. Depending on the comparison of distances and/or depending on the inputs to the decision matrix, user computing device 109 may determine whether the negotiable instrument is properly placed with respect to the camera or scanner 107, or whether movement of the camera or scanner 107 is warranted. In the example of FIG. 7B, the user computing device 109 may determine that the negotiable instrument is slightly left of the alignment guide 602, and therefore output an aural command to move "left".

Likewise, FIG. 7C is an illustration 716 that three sides of the negotiable instrument 701 are detected. For example, a distance between line 706 and line 718 may be calculated. Further, a distance between lines 720 may be calculated. Given the distances determined and/or depending on the inputs to the decision matrix, the user computing device 109 may determine that no zoom is warranted and that the negotiable instrument is far left of the alignment guide 602. In response to the determination, the user computing device 109 may output an aural command to move "far left".

Figure 7D:
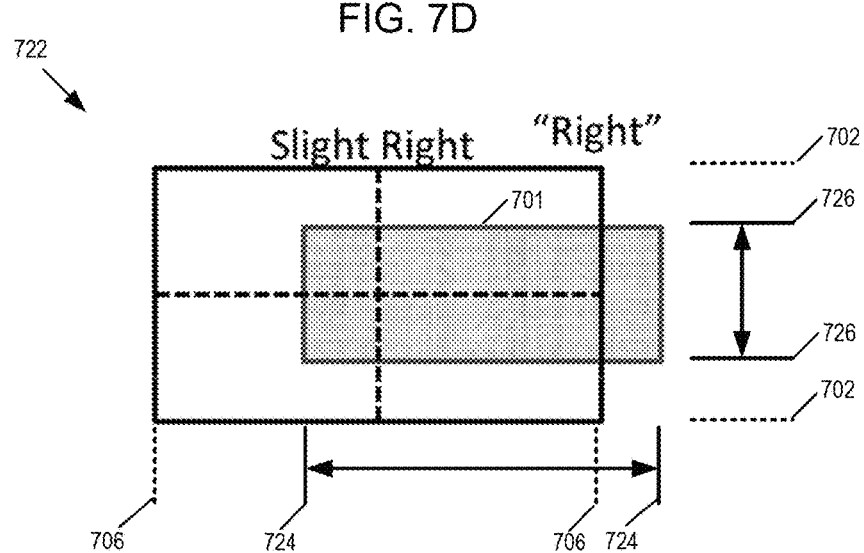
FIGS. 7D-E show an alignment guide and a negotiable instrument within the alignment guide indicating no zoom is recommended and illustrating right movement is recommended.
Figure 7E:
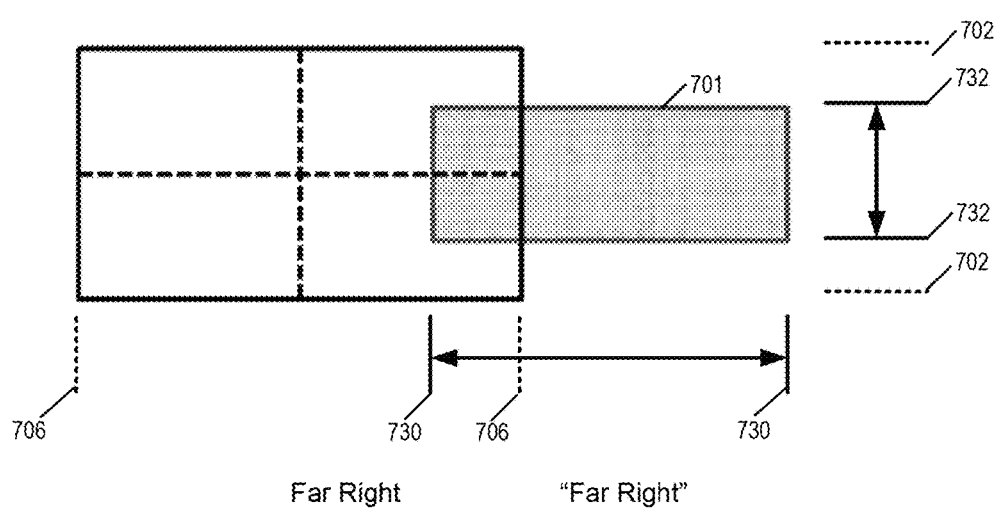

FIGS. 7D-E show an alignment guide and a negotiable instrument within the alignment guide indicating no zoom is recommended and illustrating right movement is recommended. FIG. 7D is an illustration 722 that three sides of the negotiable instrument 701 are detected. For example, a distance between line 706 and line 724 may be calculated. Further, a distance between lines 726 may be calculated. Given the distances determined and/or depending on the inputs to the decision matrix, the user computing device 109 may determine that no zoom is warranted and that the negotiable instrument is right of the alignment guide 602. In turn, the user computing device 109 may output an aural command to move "right". FIG. 7E is an illustration 728 that three sides of the negotiable instrument 701 are detected, with distances between lines 732 and line 706 and line 730 calculated. Given the distances determined and/or depending on the inputs to the decision matrix, the user computing device 109 may determine that no zoom is warranted and that the negotiable instrument is far right of the alignment guide 602. In turn, the user computing device 109 may output an aural command to move "far right".

Figure 7F:
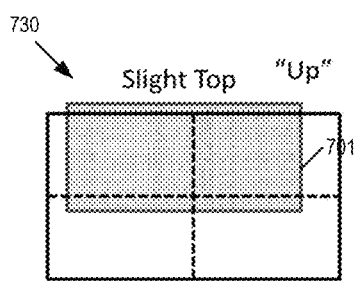
FIGS. 7F-I show an alignment guide and a negotiable instrument within the alignment guide indicating no zoom is recommended, with FIGS. 7F-G illustrating upward movement is recommended and FIGS. 7H-I illustrating downward movement is recommended.
Figure 7G:
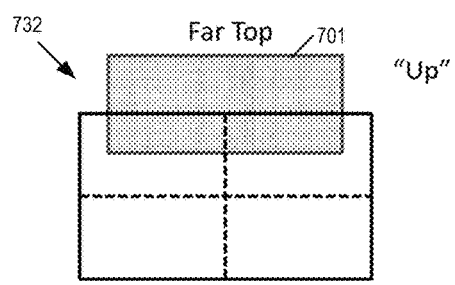
Figure 7H:
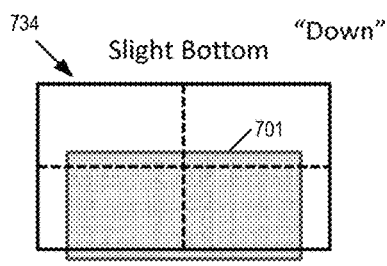
Figure 7I:
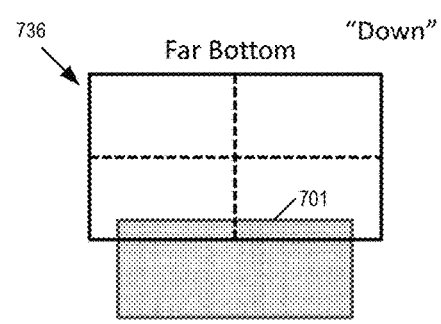

FIGS. 7F-I show an alignment guide and a negotiable instrument within the alignment guide indicating no zoom is recommended, with FIGS. 7F-G are illustrations 730, 732 that upward movement is recommended and FIGS. 7H-I are illustrations 734, 736 that downward movement is recommended.

Figure 7J:
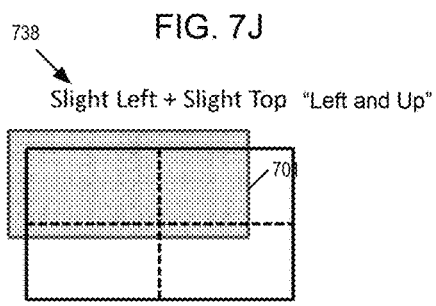
FIGS. 7J-M show an alignment guide and a negotiable instrument within the alignment guide indicating no zoom is recommended, and illustrating upward and leftward movement is recommended.
Figure 7K:
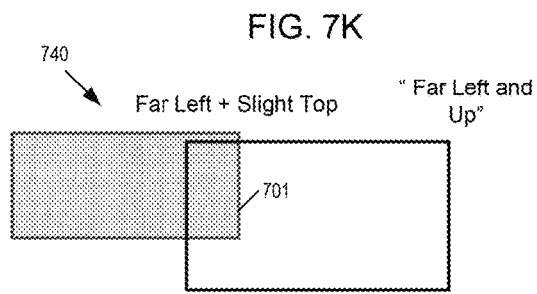
Figure 7L:
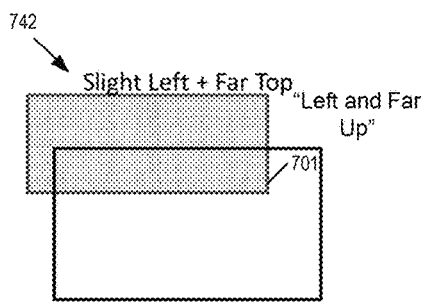
Figure 7M:
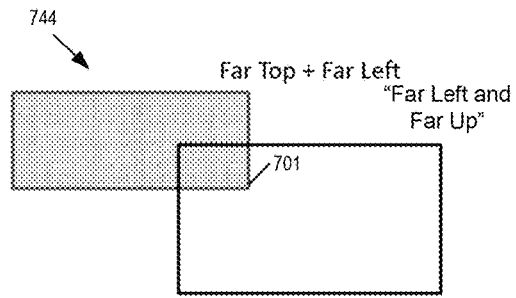

FIGS. 7J-M show an alignment guide and a negotiable instrument within the alignment guide indicating no zoom is recommended, with FIG. 7J including an illustration 738 determining that the camera should be moved slightly left and slightly upward, with an aural output of "left and up", with FIG. 7K including an illustration 740 determining that the camera should be moved far left and slightly upward, with an aural output of "far left and up", with FIG. 7L including an illustration 742 determining that the camera should be moved slightly left and far upward, with an aural output of "left and far up", and with FIG. 7M including an illustration 744 determining that the camera should be moved far left and far upward, with an aural output of "far left and far up".

Figure 7N:
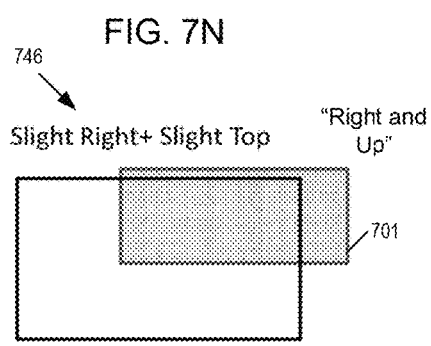
FIGS. 7N-Q show an alignment guide and a negotiable instrument within the alignment guide indicating no zoom is recommended, and illustrating upward and rightward movement is recommended.
Figure 7O:
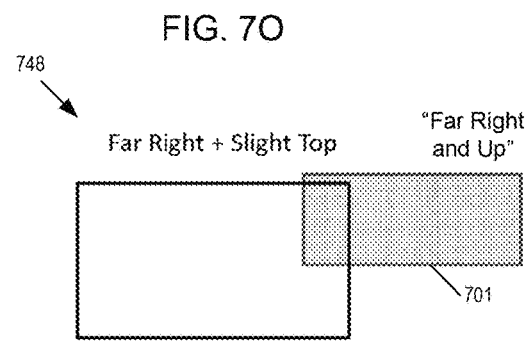
Figure 7P:
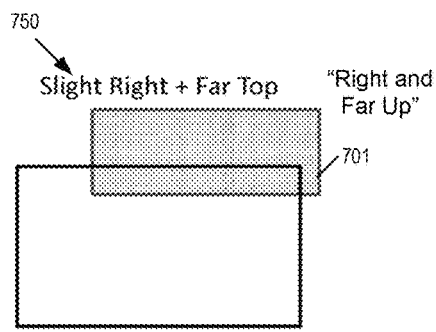
Figure 7Q:
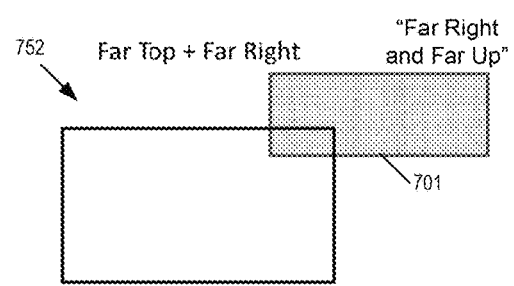

FIGS. 7N-Q show an alignment guide and a negotiable instrument within the alignment guide indicating no zoom is recommended, with FIG. 7N including an illustration 746 determining that the camera should be moved slightly right and slightly upward, with an aural output of "right and up", with FIG. 7O including an illustration 748 determining that the camera should be moved far right and slightly upward, with an aural output of "far right and up", with FIG. 7P including an illustration 750 determining that the camera should be moved slightly right and far upward, with an aural output of "right and far up", and with FIG. 7Q including an illustration 752 determining that the camera should be moved far right and far upward, with an aural output of "far right and far up".

FIGS. 7R-U show an alignment guide and a negotiable instrument within the alignment guide indicating no zoom is recommended, with FIG. 7R including an illustration 754 determining that the camera should be moved slightly left and slightly downward, with an aural output of "left and downward", with FIG. 7S including an illustration 756 determining that the camera should be moved far left and slightly downward, with an aural output of "far left and downward", with FIG. 7T including an illustration 758 determining that the camera should be moved slightly left and far downward, with an aural output of "left and far downward", and with FIG. 7U including an illustration 760 determining that the camera should be moved far left and far downward, with an aural output of "far left and far downward".

FIGS. 7V-Y show an alignment guide and a negotiable instrument within the alignment guide indicating no zoom is recommended, with FIG. 7V including an illustration 762 determining that the camera should be moved slightly right and slightly downward, with an aural output of "right and downward", with FIG. 7 W including an illustration 764 determining that the camera should be moved far right and slightly downward, with an aural output of "far right and downward", with FIG. 7X including an illustration 766 determining that the camera should be moved slightly right and far downward, with an aural output of "right and far downward", and with FIG. 7Y including an illustration 768 determining that the camera should be moved far right and far downward, with an aural output of "far right and far downward".

Figure 8A:
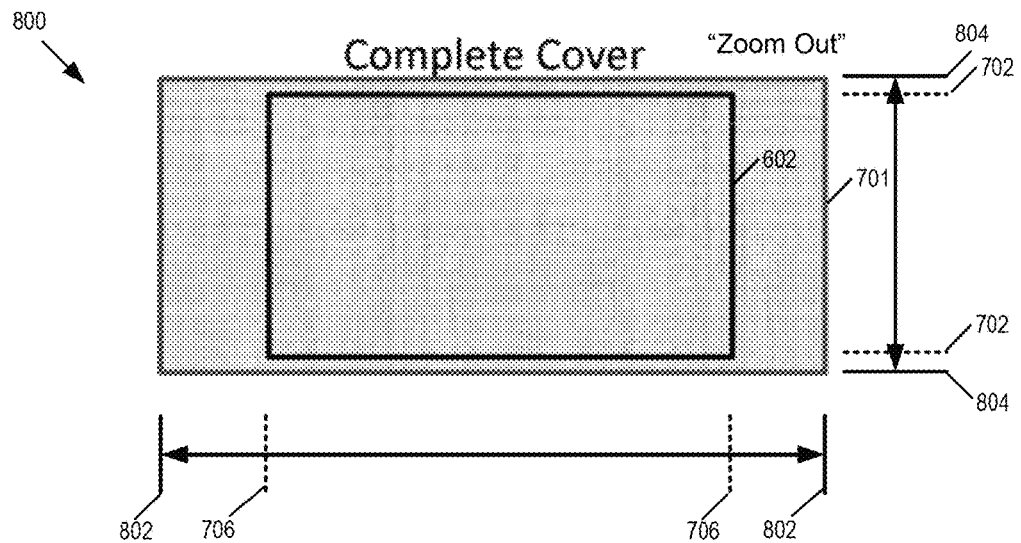
FIG. 8A shows an alignment guide and a negotiable instrument within the alignment guide indicating zoom out is recommended and illustrating proper alignment

FIG. 8A has an illustration 800 showing an alignment guide 602 and a negotiable instrument 701 within the alignment guide indicating zoom out is recommended and illustrating proper alignment. FIG. 8A illustrates distances between lines 802 and between lines 804, showing that no edges are within the alignment guide 602. As discussed in more detail below, in response to determining that 2 or fewer edges are detected, the user computing device 109 may determine that zoom out is warranted.

FIGS. 8B-C show an alignment guide and a negotiable instrument within the alignment guide indicating zoom out is recommended and illustrating left movement is recommended. In particular, FIG. 8B has an illustration 806, with distances between lines 810 and between lines 808, showing that 1 edge is within the alignment guide 602. Because of the determined inputs to the decision matrix, the user computing device 109 may determine that leftward movement is warranted. Further, FIG. 8C has an illustration 812, with distances between lines 814 and between lines 816, showing that the detected edge is within the alignment guide 602. Because of the determined inputs to the decision matrix, the user computing device 109 may determine that far leftward movement is warranted.

Figure 8D:
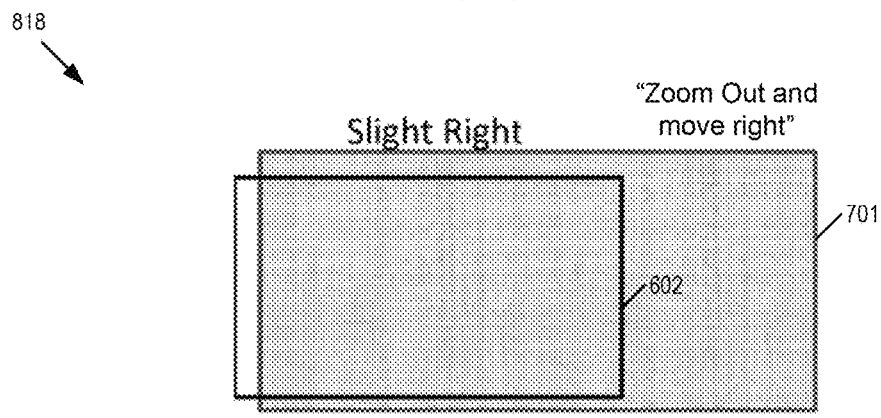
FIGS. 8D-E show an alignment guide and a negotiable instrument within the alignment guide indicating zoom out is recommended and illustrating right movement is recommended.
Figure 8E:
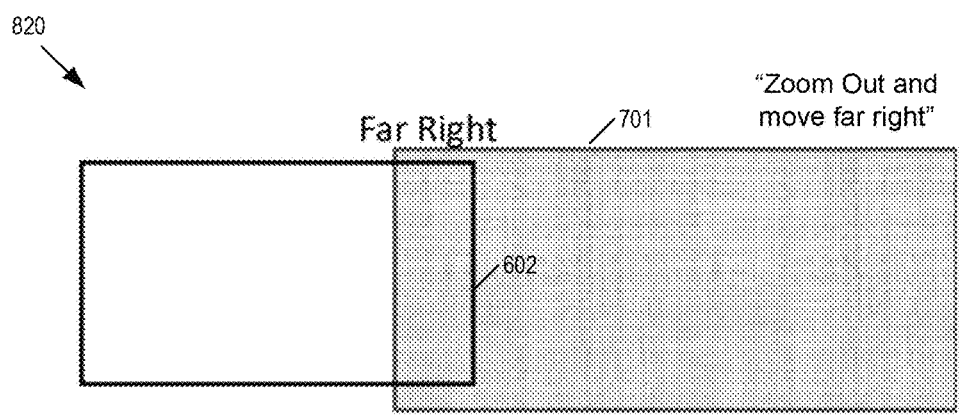

FIGS. 8D-E show an alignment guide and a negotiable instrument within the alignment guide indicating zoom out is recommended and illustrating right movement is recommended. In particular, FIG. 8D has an illustration 818. Because of the determined inputs to the decision matrix, the user computing device 109 may determine that rightward movement is warranted. Further, FIG. 8E has an illustration 820. Because of the determined inputs to the decision matrix, the user computing device 109 may determine that far rightward movement is warranted. FIGS. 8F-I show an alignment guide and a negotiable instrument within the alignment guide indicating zoom out is recommended. In each of FIGS. 8F-I, a sole edge of the negotiable instrument 701 is detected, thus warranting a zoom out. Further, FIG. 8F is an illustration 830 with the sole edge, determined to be the bottom edge (based on pixel transition), in the upper half of the alignment guide 602, thereby warranting downward movement. FIG. 8G is an illustration 832 of the sole top edge in the bottom half of the alignment guide 602, warranting far downward movement. FIG. 8H is an illustration 834 of the sole bottom edge in the upper half of the alignment guide 602, warranting far upward movement. FIG. 8I is an illustration 836 of the sole bottom edge in the bottom half of the alignment guide 602, warranting slight downward movement.

Figure 8J:
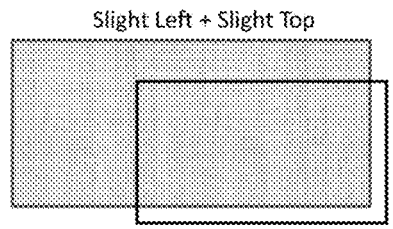
FIGS. 8J-M show an alignment guide and a negotiable instrument within the alignment guide indicating zoom out is recommended, and illustrating upward and leftward movement is recommended.
Figure 8K:
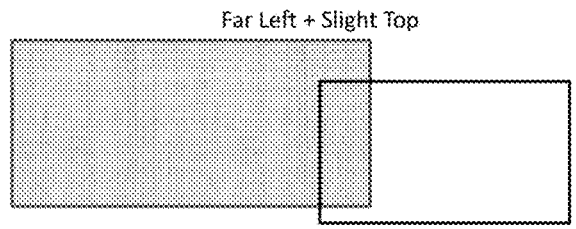
Figure 8L:
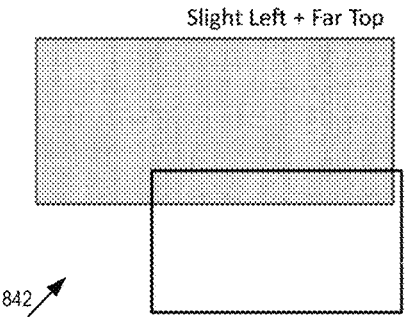
Figure 8M:
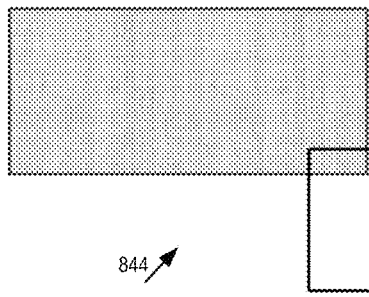

FIGS. 8J-M show an alignment guide and a negotiable instrument within the alignment guide indicating zoom out is recommended, and illustrating upward and leftward movement is recommended. In particular, FIG. 8J is an illustration 838 showing the right edge (in the right half of the alignment guide 602) and the bottom edge (in the bottom half of the alignment guide 602) detected, warranting slight left and slight upward movement. FIG. 8K is an illustration 840 showing the right edge (in the left half of the alignment guide 602) and the bottom edge (in the bottom half of the alignment guide 602) detected, warranting far left and slight upward movement. FIG. 8L is an illustration 842 showing the right edge (in the right half of the alignment guide 602) and the bottom edge (in the top half of the alignment guide 602) detected, warranting slight left and far upward movement. FIG. 8M is an illustration 844 showing the right edge (in the left half of the alignment guide 602) and the bottom edge (in the top half of the alignment guide 602) detected, warranting far left and far upward movement.

Figure 8N:
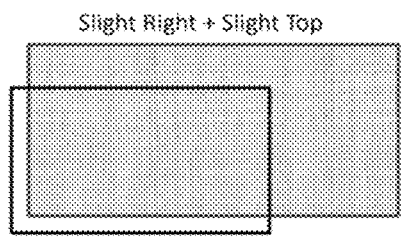
FIGS. 8N-Q show an alignment guide and a negotiable instrument within the alignment guide indicating zoom out is recommended, and illustrating upward and rightward movement is recommended.
Figure 8O:
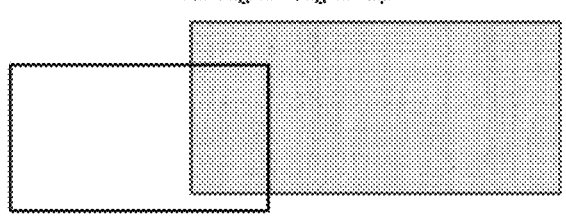
Figure 8P:
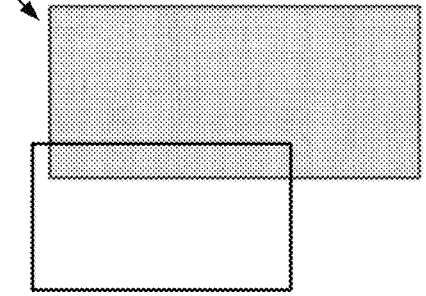
Figure 8Q:
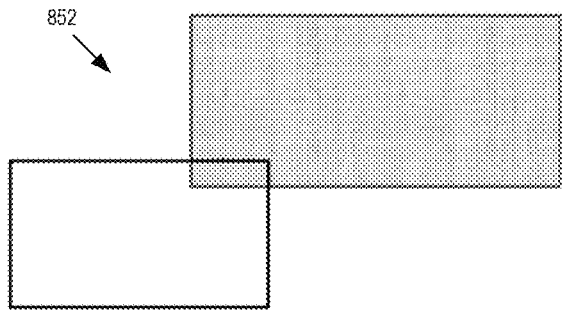

FIGS. 8N-Q show an alignment guide and a negotiable instrument within the alignment guide indicating zoom out is recommended, and illustrating upward and rightward movement is recommended. In particular, FIG. 8N is an illustration 846 showing the left edge (in the left half of the alignment guide 602) and the bottom edge (in the bottom half of the alignment guide 602) detected, warranting slight right and slight upward movement. FIG. 8O is an illustration 848 showing the left edge (in the right half of the alignment guide 602) and the bottom edge (in the bottom half of the alignment guide 602) detected, warranting far right and slight upward movement. FIG. 8P is an illustration 850 showing the left edge (in the left half of the alignment guide 602) and the bottom edge (in the top half of the alignment guide 602) detected, warranting slight right and far upward movement. FIG. 8Q is an illustration 852 showing the left edge (in the right half of the alignment guide 602) and the bottom edge (in the top half of the alignment guide 602) detected, warranting far right and far upward movement.

Figure 8R:
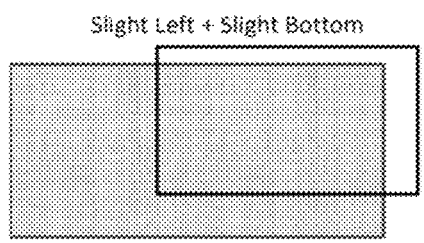
FIGS. 8R-U show an alignment guide and a negotiable instrument within the alignment guide indicating zoom out is recommended, and illustrating downward and leftward movement is recommended.
Figure 8S:
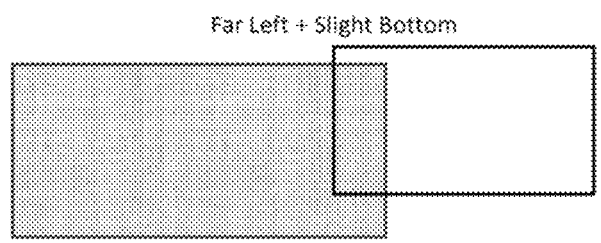
Figure 8T:
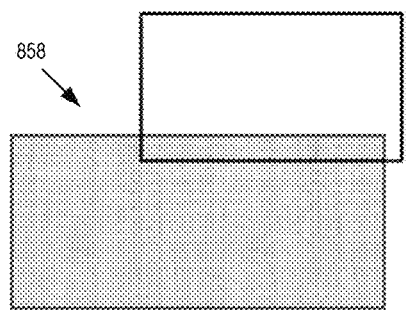
Figure 8U:
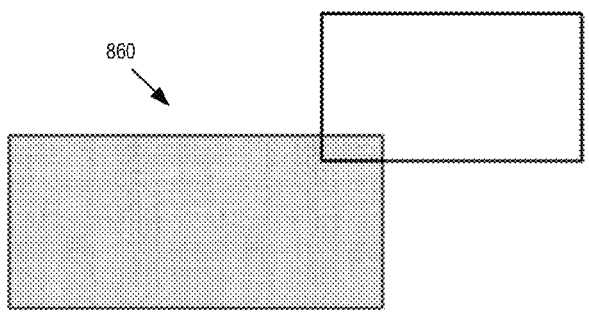

FIGS. 8R-U show an alignment guide and a negotiable instrument within the alignment guide indicating zoom out is recommended, and illustrating downward and leftward movement is recommended. In particular, FIG. 8R is an illustration 854 showing the right edge (in the right half of the alignment guide 602) and the top edge (in the top half of the alignment guide 602) detected, warranting slight left and slight downward movement. FIG. 8S is an illustration 856 showing the right edge (in the left half of the alignment guide 602) and the top edge (in the top half of the alignment guide 602) detected, warranting far left and slight downward movement. FIG. 8T is an illustration 858 showing the right edge (in the right half of the alignment guide 602) and the top edge (in the bottom half of the alignment guide 602) detected, warranting slight left and far downward movement. FIG. 8U is an illustration 860 showing the right edge (in the left half of the alignment guide 602) and the top edge (in the bottom half of the alignment guide 602) detected, warranting far left and far downward movement.

FIGS. 8V-Y show an alignment guide and a negotiable instrument within the alignment guide indicating zoom out is recommended, and illustrating downward and rightward movement is recommended. In particular, FIG. 8V is an illustration 862 showing the left edge (in the left half of the alignment guide 602) and the top edge (in the top half of the alignment guide 602) detected, warranting slight right and slight downward movement. FIG. 8W is an illustration 864 showing the left edge (in the right half of the alignment guide 602) and the top edge (in the top half of the alignment guide 602) detected, warranting far right and slight downward movement. FIG. 8X is an illustration 866 showing the left edge (in the left half of the alignment guide 602) and the top edge (in the bottom half of the alignment guide 602) detected, warranting slight right and far downward movement. FIG. 8Y is an illustration 868 showing the left edge (in the right half of the alignment guide 602) and the top edge (in the bottom half of the alignment guide 602) detected, warranting far right and far downward movement.

Figure 9A:
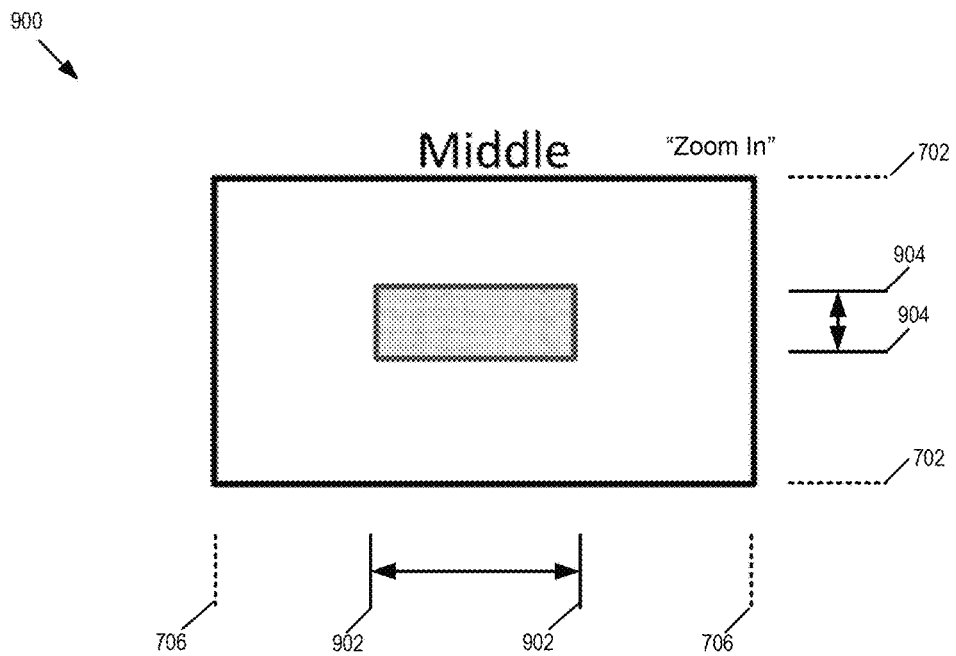
FIG. 9A shows an alignment guide and a negotiable instrument within the alignment guide indicating zoom in is recommended and illustrating proper alignment

FIG. 9A shows an alignment guide and a negotiable instrument within the alignment guide indicating zoom in is recommended and illustrating proper alignment. In particular, FIG. 9A is an illustration 900, with distances between lines 902 and lines 904. As discussed in more detail below, the distances may be compared with one another, and with the distances between lines 702 and 706. In this instance, the comparison indicates that zoom in is warranted.

Figure 9B:
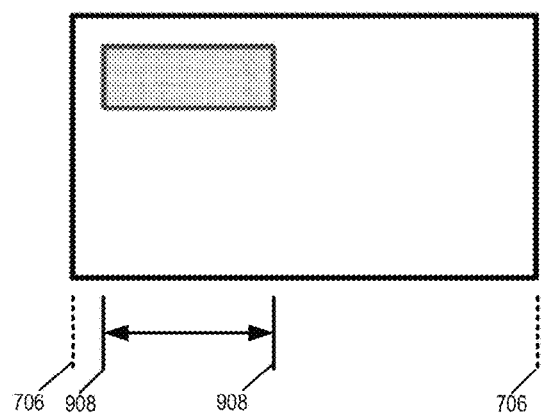
FIGS. 9B-C show an alignment guide and a negotiable instrument within the alignment guide indicating zoom in is recommended and illustrating the negotiable instrument in the upper left quadrant in FIG. 9B and in the upper right quadrant in FIG. 9C.
Figure 9B:
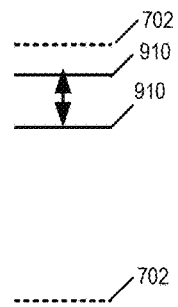
Figure 9C:
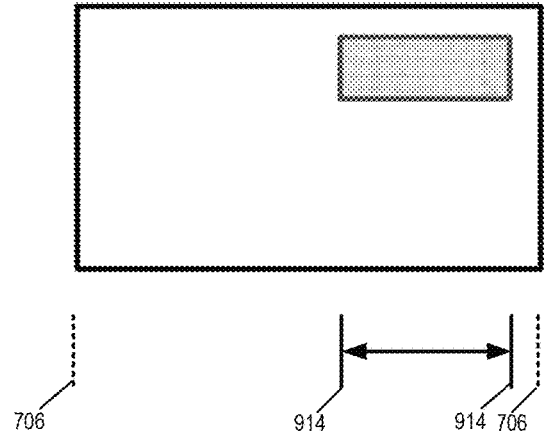
Figure 9C:
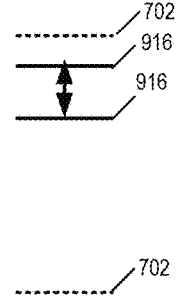
Figure 9B:
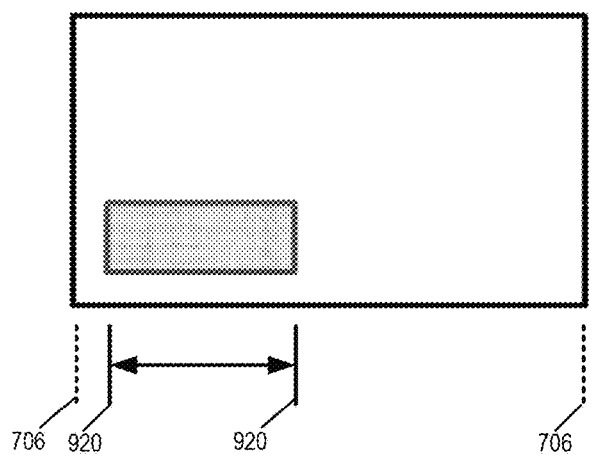
Figure 9C:
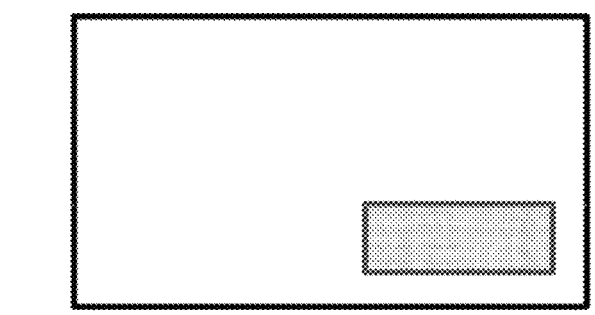
Figure 9J:
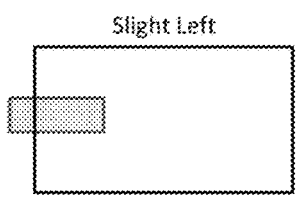
FIGS. 9J-O show an alignment guide and a negotiable instrument within the alignment guide indicating zoom in is recommended, and illustrating leftward movement is recommended (FIG. 9J), illustrating leftward movement and downward movement is recommended (FIG. 9K), illustrating leftward movement and upward movement is recommended (FIG. 9L), illustrating rightward movement is recommended (FIG. 9M), illustrating rightward movement and upward movement is recommended (FIG. 9N), and illustrating rightward movement and downward movement is recommended (FIG. 9O)
Figure 9K:
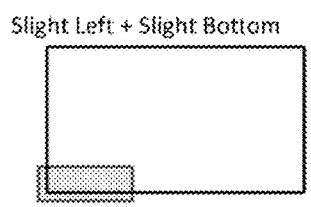
Figure 9L:
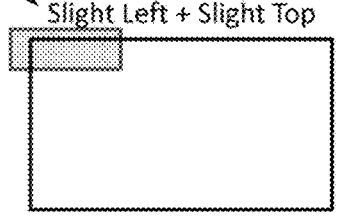
Figure 9M:
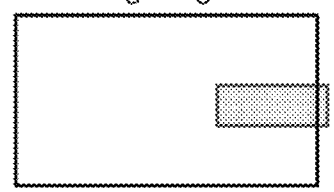
Figure 9N:
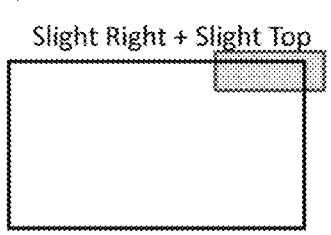

FIGS. 9B-C show an alignment guide and a negotiable instrument within the alignment guide indicating zoom in is recommended and illustrating the negotiable instrument in the upper left quadrant in FIG. 9B and in the upper right quadrant in FIG. 9C. In particular, FIG. 9B is an illustration 906, with distances between lines 908 and lines 910, and FIG. 9C is an illustration 912, with distances between lines 914 and lines 916.

FIGS. 9D-E show an alignment guide and a negotiable instrument within the alignment guide indicating zoom in is recommended and illustrating the negotiable instrument in the lower left quadrant in FIG. 9D and in the lower right quadrant in FIG. 9E. In particular, FIG. 9D is an illustration 918, with distances between lines 920 and lines 922, and FIG. 9E is an illustration 924, with distances between lines 926 and lines 928.

FIGS. 9F-I include illustrations 930, 932, 934, 936 with an alignment guide and a negotiable instrument within the alignment guide indicating zoom in is recommended, with the figures illustrating left middle, top middle, right middle and bottom middle, respectively.

Figure 9O:
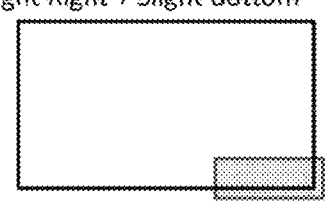

FIGS. 9J-O include illustrations 938, 940, 942, 944, 946, 948 that show an alignment guide and a negotiable instrument within the alignment guide indicating zoom in is recommended, and illustrating leftward movement is recommended (FIG. 9J), illustrating leftward movement and downward movement is recommended (FIG. 9K), illustrating leftward movement and upward movement is recommended (FIG. 9L), illustrating rightward movement is recommended (FIG. 9M), illustrating rightward movement and upward movement is recommended (FIG. 9N), and illustrating rightward movement and downward movement is recommended (FIG. 9O).

For example, a two-step process may be performed. A first step determines whether to zoom in or zoom out. In determining whether to zoom in or zoom out, the count of black pixels may be compared with the count of white pixels. As discussed above, in one instance, a grayscale image may have 256 possibilities for each pixel, with values less than 128 assumed to be black and values equal to or greater than 128 assumed to be white. In this example, if black pixels cover >90% of image, the user is sent an audio instruction to "Zoom In", and if black pixels cover <10% of image, the user is sent an audio instruction "Zoom Out". The 90% and 10% thresholds are dynamic and can be modified.

The second step is to perform edge detection. In particular, edge detection is performed for each side of the negotiable instrument (e.g., top, bottom, left, right). Based on edge detection results, a decision matrix (discussed above) may be used to determine what voice command should be sent to the user.

Figure 10A:
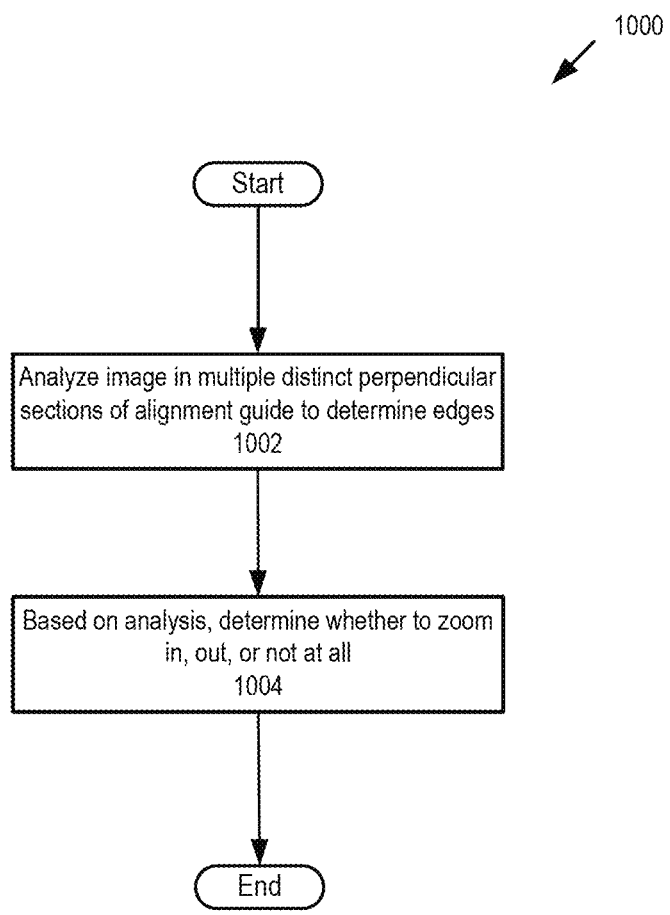
FIG. 10A illustrates a first flow chart to determine whether to command a zoom in, a zoom out, or no zoom at all.

As discussed above, the user computing device 109 may determine whether the user's placement of the camera or scanner 107 relative to the negotiable instrument may be in error in one, some or all of the x-direction, the y-direction, and the z-direction. In a specific example, the user computing device 109 may determine the user's placement of the camera or scanner 107 in a single direction, such as the z-direction, and then output an aural command. FIG. 10A illustrates a first flow chart 1000 to determine whether to command a change in the z-direction, such as a zoom in, a zoom out, or no zoom at all. At 1002, the image is analyzed in multiple distinct perpendicular sections of the alignment guide 602 to determine edges of the negotiable instrument in the image. For example, the alignment guide 602 may be divided using horizontal partition 604 resulting in two partitions, including an upper half of the alignment guide 602 and a lower half of the alignment guide 602. The upper half and the lower half of the alignment guide 602 are perpendicular to one another, and may be analyzed, such as disclosed in FIGS. 6A-G, in order to determine whether there are edges of the negotiable instrument in the respective partitions of the alignment guide 602. As another example, the alignment guide 602 may be divided using vertical partition 606 resulting in two partitions, including a left half of the alignment guide 602 and a right half of the alignment guide 602. The left half and the right half of the alignment guide 602 are perpendicular to one another, and may be analyzed, such as disclosed in FIG. 6H, in order to determine whether there are edges of the negotiable instrument in the respective partitions of the alignment guide 602. At 1004, based on the analysis, it is determined whether to zoom in, zoom out, or not zoom at all.

Figure 10B:
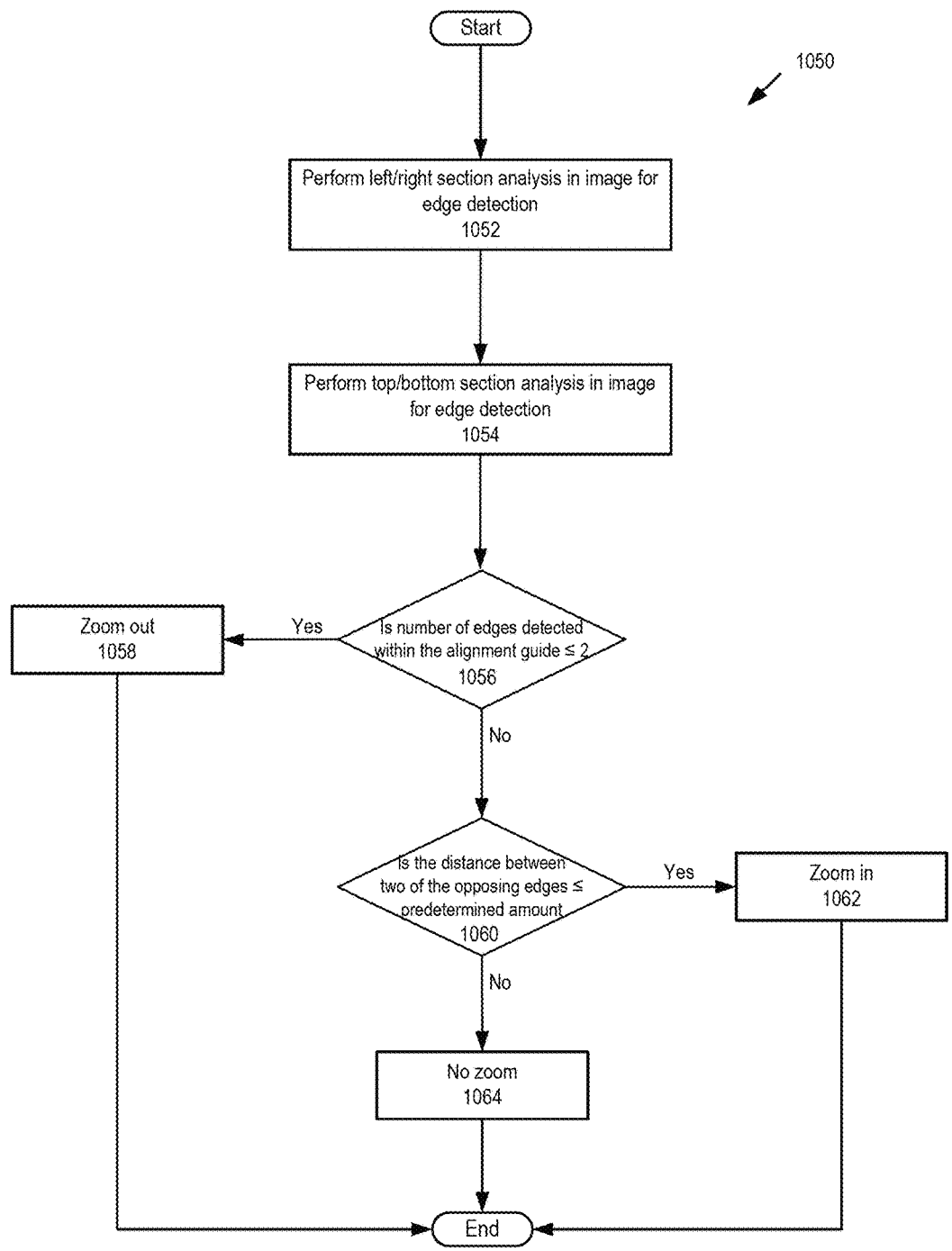
FIG. 10B illustrates a second flow chart to determine whether to command a zoom in, a zoom out, or no zoom at all.

FIG. 10B illustrates a second flow chart 1050 to determine whether to command a zoom in, a zoom out, or no zoom at all. One or more of the sections of the alignment guide 602 may be analyzed. For example, left and right sections, and top and bottom sections may be analyzed for edge detection. In particular, at 1052, edge detection of the left and right sections of the image are performed. Likewise, at 1054, edge detection of the top and bottom sections of the image are performed. Though FIG. 10B illustrates that the left and right sections are analyzed prior to the top and bottom sections, the converse may likewise be performed.

Thus, a slice of the region in the alignment guide 602 may be checked in both the vertical direction from the top and the bottom and the left and right direction in the horizontal region. In this regard, the various regions may be used to determine where the edge of the check is within the alignment guide 602 with reasonable accuracy.

For example, the upper half of the alignment guide 602 (defined horizontal partition 604 for alignment guide 602) may be analyzed pixel-by-pixel row from the left side of the alignment guide 602 to the right side of the alignment guide 602, with the analysis searching for black or white pixels from the top down and from bottom up of the upper half of the alignment guide 602.

In one example, the background will register pixels that are "black" in value and the negotiable instrument will register pixels that are "white". In this instance, for an edge of the document, it is assumed that the processed image has a transition from black pixels to white pixels (e.g., all black pixels in the vertical row being analyzed from top until it reaches a set of white pixels). In this regard, checking in both directions (e.g., from top to bottom, and from bottom to top) as discussed for example in FIG. 6B) may remove transient effects. The same analysis may be performed for the lower half of the alignment guide 602. In particular, the lower half of the alignment guide 602 may be divided into individual columns of pixels from left to right across the entire alignment guide 602.

In order to apply the edge detection algorithm to determine the number of edges within the alignment guide 602, the image may initially be captured in color, then converted to grey scale, and finally converted from grey scale to a black and white matrix. In one example, the conversion assigns a value from zero (black) to 255 (white). For example, all pixels having a value of zero to 122 may be assigned a black designation (or zero) and all pixels having a grey scale value of 123 to 255 may be assigned a white designation (or one). These zeros and ones may then be left in an array associated with the location in the alignment guide 602 and the column by column analysis of the pixels described above may be applied to determine the number of edges.

The number of edges detected is then analyzed. For example, at 1056, it is determined whether the number of edges detected within the alignment guide 602 is less than or equal to 2. If so, at 1058, it is determined to zoom out. In turn, an aural command is generated for the user to zoom out or move the camera/scanner further away from the negotiable instrument. If the number of edges detected is 3 or greater, at 1060, it is determined whether the distance between two of the opposing edges detected is less than or equal to a predetermined amount. In response to determining that the distance between two of the opposing edges detected is less than or equal to a predetermined amount, at 1062, it is determined to zoom in. In turn, an aural command is generated for the user to zoom in or move the camera/scanner closer to the negotiable instrument. In response to determining that the distance between two of the opposing edges detected is not less than or equal to a predetermined amount, at 1064, it is determined not to zoom in.

Figure 11:
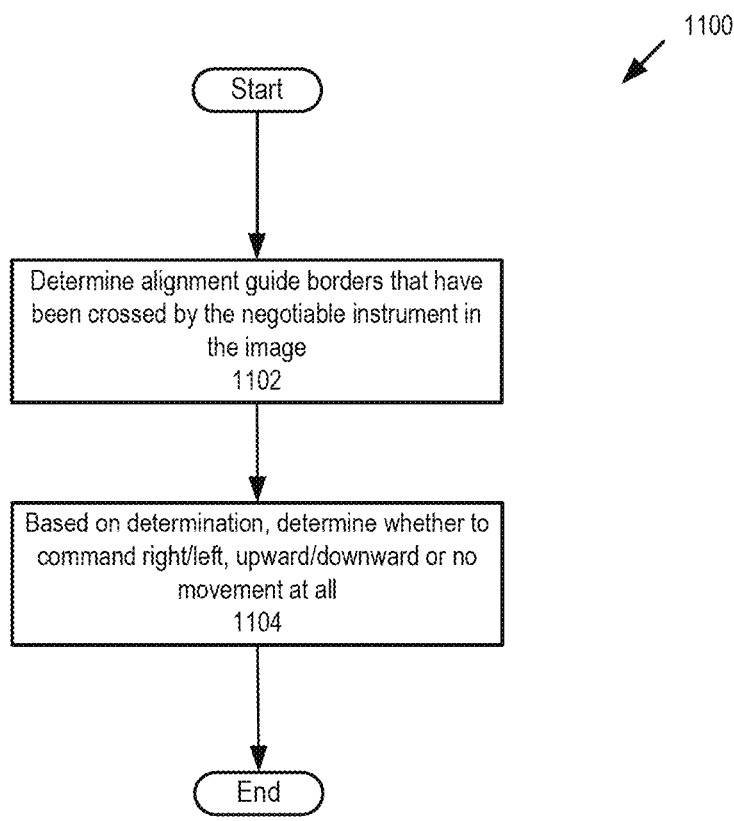
FIG. 11 illustrates a first flow chart to determine whether to command a left/right, upward/downward movement.

A distance between the two opposing edges being less than the predetermined amount is indicative that the image should be zoomed in. For example, FIG. 7A illustrates two sets of opposing edges, with two opposing shorter sides and two opposing longer sides. As illustrated in FIG. 7A, the distance between lines 704 is the distance between the two opposing longer sides. Likewise, the distance between lines 708 is the distance between the two opposing shorter sides. The predetermined amount may be independent of the alignment guide 602 used, or may be dependent on the alignment guide 602 used (e.g., dependent on the type of camera used). FIG. 11 illustrates a first flow chart 1100 to determine whether to command a left/right, upward/downward movement. At 1102, it is determined that the alignment guide borders have been crossed by the negotiable instrument in the image, thereby indicating an overlap of the negotiable instrument across that border of the alignment guide. At 1104, depending on the alignment guide borders crossed, it is determined whether to command the movement right/left, upward/downward or no movement at all.

For example, the user computing device 109 may determine, based on the values of black/white pixels, whether a detected edge is a right edge, a left edge, an upper edge or a bottom edge of the negotiable instrument. Further, based on this determination and based on the borders of the alignment guide 602 crossed by the negotiable instrument, the user computing device 109 may determine whether to move the negotiable instrument (or the camera). In one particular example depicted in FIG. 7B, the user computing device 109 may determine that the left side of the alignment guide 602 is crossed by the negotiable instrument. In this regard, the user computing device 109 may determine that the negotiable instrument should be moved to the left to be entirely within the alignment guide. Conversely, in the example depicted in FIG. 7D, the user computing device 109 may determine that the right side of the alignment guide 602 is crossed by the negotiable instrument. In this regard, the user computing device 109 may determine that the negotiable instrument should be moved to the right to be entirely within the alignment guide.

Further, optionally, in addition to the user computing device 109 determining movement (left/right, upward/downward), the user computing device 109 may determine a degree of movement. For example, FIGS. 7B-C each include determinations of movement to the left, with FIG. 7B to move "left" and FIG. 7C to move "far left". The user computing device 109 may determine the degree of movement in one of several ways. In one way, the user computing device 109 may determine the distances for one or more edges of the negotiable instrument in the image, and compare them with one another. For example, the distances of opposing edges may be compared. In another way, the user computing device 109 may determine the distances for one or more edges of the negotiable instrument in the image, and compare them with distance(s) of the alignment guide.

Figure 13:
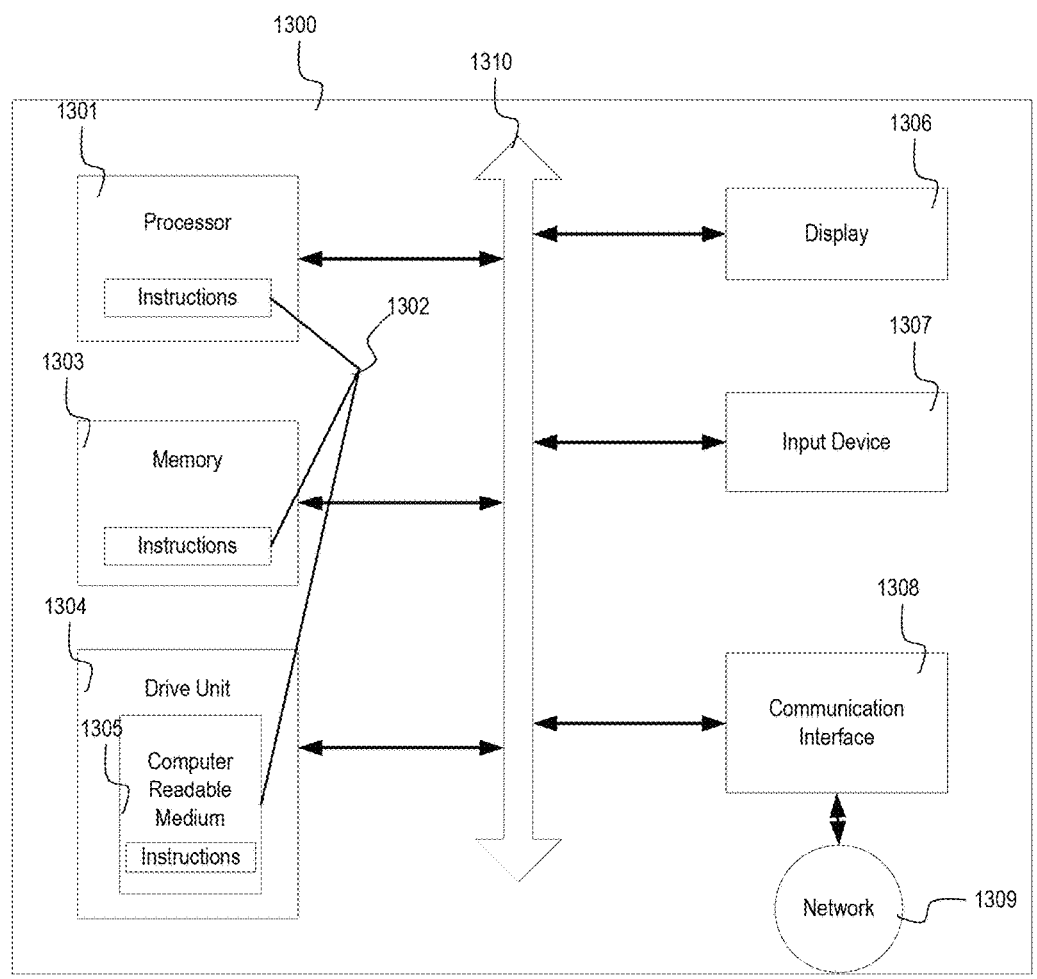
FIG. 13 is a block diagram of an example computing environment in which example embodiments and aspects may be implemented.

FIG. 13 illustrates a general computer system 1300, programmable to be a specific computer system, which may represent any server, computer or component, such as a Merchant 1, a Merchant M, a Consumer 1, a Consumer N, a product list system, or any subcomponent of the product list system, such as a product list server. The computer system 1300 may include an ordered listing of a set of instructions 1302 that may be executed to cause the computer system 1300 to perform any one or more of the methods or computer-based functions disclosed herein. The computer system 1300 may operate as a stand-alone device or may be connected, e.g., using the network 120, to other computer systems or peripheral devices.

In a networked deployment, the computer system 1300 may operate in the capacity of a server or as a client-user computer in a server-client user network environment, or as a peer computer system in a peer-to-peer (or distributed) network environment. The computer system 1300 may also be implemented as or incorporated into various devices, such as a personal computer or a mobile computing device capable of executing a set of instructions 1302 that specify actions to be taken by that machine, including and not limited to, accessing the Internet or Web through any form of browser. Further, each of the systems described may include any collection of sub-systems that individually or jointly execute a set, or multiple sets, of instructions to perform one or more computer functions. As discussed above, the instructions may be manifested in logic, such as software in software modules 209 and user computing device 109.

The computer system 1300 may include a memory 1303 on a bus 1310 for communicating information. Code operable to cause the computer system to perform any of the acts or operations described herein may be stored in the memory 1303. The memory 1303 may be a random-access memory, read-only memory, programmable memory, hard disk drive or any other type of volatile or non-volatile memory or storage device.

The computer system 1300 may include a controller or the like, such as a processor 1301, which may comprise a central processing unit (CPU) and/or a graphics processing unit (GPU). The processor 1301 may include one or more general processors, digital signal processors, application specific integrated circuits, field programmable gate arrays, digital circuits, optical circuits, analog circuits, combinations thereof, or other now known or later-developed devices for analyzing and processing data. The processor 1301 may implement the set of instructions 1302 or other software program, such as manually-programmed or computer-generated code for implementing logical functions. The logical function or any system element described may, among other functions, process and/or convert an analog data source such as an analog electrical, audio, or video signal, or a combination thereof, to a digital data source for audio-visual purposes or other digital processing purposes such as for compatibility for computer processing.

The computer system 1300 may also include a disk or optical drive unit 1304. The disk drive unit 1304 may include a computer-readable medium 1305 in which one or more sets of instructions 1302, e.g., software, can be embedded. Further, the instructions 1302 may perform one or more of the operations as described herein. The instructions 1302 may reside completely, or at least partially, within the memory 1303 and/or within the processor 1301 during execution by the computer system 1300. Accordingly, the databases may be stored in the memory 1303 and/or the disk unit 1304.

The memory 1303 and the processor 1301 also may include computer-readable media as discussed above. A "computer-readable medium," "computer-readable storage medium," "machine readable medium," "propagated-signal medium," and/or "signal-bearing medium" may include any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. Additionally, the computer system 1300 may include an input device 1307, such as a keyboard or mouse, configured for a user to interact with any of the components of computer system 1300. It may further include a display 1306, such as a liquid crystal display (LCD), a cathode ray tube (CRT), or any other display suitable for conveying information. The display 1306 may act as an interface for the user to see the functioning of the processor 1301, or specifically as an interface with the software stored in the memory 1303 or the drive unit 1304. As discussed above, the consumer-controlled device may include a display and an input device, such as input device 1307.

The computer system 1300 may include a communication interface 1308 that enables communications via the communications network 120. The network 120 may include wired networks, wireless networks, or combinations thereof. The communication interface 1308 network may enable communications via any number of communication standards, such as 802.11, 802.17, 802.20, WiMax, 802.15.4, cellular telephone standards, or other communication standards, as discussed above. Just because one of these standards is listed does not mean any one is preferred as any number of these standards may never actually be adopted in a commercial product.

Block diagrams of different aspects of the system, including FIGS. 1-5 may be implemented using the computer functionality disclosed in FIG. 13. Further, the flow diagrams illustrated in FIGS. 10A-11 may use computer readable instructions that are executed by one or more processors in order to implement the functionality disclosed. Finally, the displays may be output on an I/O device.

The present disclosure contemplates a computer-readable medium that includes instructions or receives and executes instructions responsive to a propagated signal, so that a device connected to a network may communicate voice, video, audio, images or any other data over the network. Further, the instructions may be transmitted or received over the network via a communication interface. The communication interface may be a part of the processor or may be a separate component. The communication interface may be created in software or may be a physical connection in hardware. The communication interface may be configured to connect with a network, external media, the display, or any other components in system, or combinations thereof. The connection with the network may be a physical connection, such as a wired Ethernet connection or may be established wirelessly as discussed below. In the case of a service provider server, the service provider server may communicate with users through the communication interface.

The computer-readable medium may be a single medium, or the computer-readable medium may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium may include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible and non-transitory storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

The invention claimed is:

1. A method for outputting aural guidance to a visually impaired user, the method comprising:
   receiving, at a mobile computing device, a user input indicative of requesting to image a document;
   in response to receipt of the user input, a processor of the mobile computing device automatically searching for the document in part or all of a field of view of a camera associated with the mobile computing device;
   determining an offset of the document relative to the camera, the offset comprising a direction to move one or both of the document or the camera so that the document is entirely within the field of view or so that the document is at least a certain percentage of the field of view;
   generating a first aural command, the first aural command containing one or more instructions to the user regarding a direction to move one or both of the camera or the document based on the direction;
   transmitting the first aural command from a sound generating interface associated with the mobile computing device;
   after transmitting the first aural command, determining whether the document is entirely within the field of view or is at least the certain percentage of the field of view; and responsive to the determining that the document is entirely within the field of view or is at least the certain percentage of the field of view, transmitting a second aural command from the sound generating interface, the second aural command containing one or more instructions to the user to hold the camera steady.

2. The method of claim 1, wherein the camera includes an alignment guide;
wherein determining the offset of the document relative to the camera comprises determining the direction to move so that the document is within the alignment guide; and
further comprising automatically capturing an image of the document upon determining that an entirety of the document is within the alignment guide.

3. The method of claim 1, wherein the direction comprises a direction perpendicular to a surface of the document; and
wherein the first aural command comprises moving the camera closer to or further away from the document.

4. The method of claim 3, wherein determining the offset of the document relative to the field of view of the camera comprises:
searching an image of the document in order to identify a number of edges for the document; and
determining the offset based on the number of edges identified.

5. The method of claim 1, wherein the document comprises a negotiable instrument.

6. The method of claim 1, wherein the first aural command contains one or more instructions to the user regarding the direction to move the camera relative to the document.

7. The method of claim 1, wherein determining the offset of the document relative to the camera comprises:
determining a first offset of the document relative to the camera based on a first image generated by the camera;
determining a second offset of the document relative to the camera based on a second image generated by the camera, wherein the second image is generated by the camera later in time than the first image generated by the camera; and
determining a change between the first offset and the second offset, wherein the first aural command is a relative command indicating a command based on previous movement of the user.

8. A mobile apparatus to output aural guidance to a visually impaired user, the apparatus comprising:
an image capture device;
an input device configured to receive a user input indicative of requesting to image a document;
an aural output device configured to output aural commands; and
a controller in communication with the image capture device, the input device, and the aural output device, the controller configured to:
in response to receipt of the user input, automatically search for the document in part or all of a field of view of image capture device;
determine an offset of the document relative to the image capture device, the offset comprising a direction to move one or both of the document or the image capture device so that the document is entirely within the field of view or so that the document is at least a certain percentage of the field of view;
generate a first aural command, the first aural command containing one or more instructions to a user regarding the direction to move one or both of the image capture device or the document;
transmit the aural command to the aural output device for output of the aural command;
after transmitting the first aural command, determine whether the document is entirely within the field of view or is at least the certain percentage of the field of view; and
responsive to the determining that the document is entirely within the field of view or is at least the certain percentage of the field of view, transmit a second aural command from the aural output device, the second aural command containing one or more instructions to the user to hold the image capture device steady.

9. The apparatus of claim 8, wherein the image capture device includes an alignment guide;
wherein the controller is configured to determine the offset of the document relative to the image capture device by determining the direction to move so that the document is within the alignment guide; and
wherein the controller is further configured to automatically capture an image of the document upon determining that an entirety of the document is within the alignment guide.

10. The apparatus of claim 8, wherein the direction comprises a direction perpendicular to a surface of the document; and
wherein the first aural command comprises moving the image capture device closer to or further away from the document.

11. The apparatus of claim 10, wherein the controller is configured to determine the offset of the document relative to the field of view of the image capture device by:
searching an image of the document in order to identify a number of edges for the document; and
determining the offset based on the number of edges identified.

12. The apparatus of claim 8, wherein the first aural command contains one or more instructions to the user regarding the direction to move the image capture device relative to the document.

13. The apparatus of claim 8, wherein the controller is configured to determine the offset of the document relative to the image capture device by:
determining a first offset of the document relative to the image capture device based on a first image generated by the image capture device;
determining a second offset of the document relative to the image capture device based on a second image generated by the image capture device, wherein the second image is generated by the camera later in time than the first image generated by the camera; and
determining a change between the first offset and the second offset, wherein the first aural command is a relative command indicating a command based on previous movement of the user.

* * * * *